(12) United States Patent
Yamazaki

(10) Patent No.: US 11,682,331 B2
(45) Date of Patent: Jun. 20, 2023

(54) DISPLAY SYSTEM, DISPLAY METHOD AND DISPLAY PROGRAM BASED ON POSITIONAL RELATIONSHIP OF GEOMAGNETIC SENSORS BETWEEN DISPLAY DEVICE AND INFORMATION PROCESSING DEVICE

(71) Applicant: SEIKO EPSON CORPORATION, Tokyo (JP)

(72) Inventor: Akio Yamazaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/033,910

(22) Filed: Sep. 27, 2020

(65) Prior Publication Data
US 2021/0097915 A1 Apr. 1, 2021

(30) Foreign Application Priority Data
Sep. 30, 2019 (JP) .............................. JP2019-178875

(51) Int. Cl.
*G02B 27/01* (2006.01)
*G09G 3/20* (2006.01)

(52) U.S. Cl.
CPC ........... *G09G 3/20* (2013.01); *G02B 27/0172* (2013.01); *G02B 27/0179* (2013.01); *G02B 2027/014* (2013.01); *G09G 2354/00* (2013.01); *G09G 2356/00* (2013.01); *G09G 2370/06* (2013.01)

(58) Field of Classification Search
CPC .......... G02B 2027/014; G02B 27/0172; G02B 27/0179; G09G 2354/00; G09G 2356/00; G09G 2370/06; G09G 3/20
See application file for complete search history.

(56) References Cited

U.S. PATENT DOCUMENTS

| 2012/0242560 | A1* | 9/2012 | Nakada | ................ | G09G 3/3406 345/8 |
| 2013/0083003 | A1* | 4/2013 | Perez | ...................... | A63F 13/79 345/419 |
| 2017/0059871 | A1* | 3/2017 | Hashiba | .................. | A63F 13/25 |

FOREIGN PATENT DOCUMENTS

JP 2012204998 10/2012

* cited by examiner

*Primary Examiner* — Ram A Mistry
(74) *Attorney, Agent, or Firm* — JCIPRNET

(57) ABSTRACT

A wearable display device that is a display device, an information processing device configured to connect to a wearable display device, a first sensor including a first geomagnetic sensor, a second sensor including a second geomagnetic sensor, and a display control part configured to change a display mode of the wearable display device in accordance with a relative positional relationship between the wearable display device and the information processing device on the basis of a detection result are provided.

11 Claims, 20 Drawing Sheets

DISPLAY SYSTEM, DISPLAY METHOD AND DISPLAY PROGRAM BASED ON POSITIONAL RELATIONSHIP OF GEOMAGNETIC SENSORS BETWEEN DISPLAY DEVICE AND INFORMATION PROCESSING DEVICE

The present application is based on, and claims priority from JP Application Serial Number 2019-178875, filed Sep. 30, 2019, the disclosure of which is hereby incorporated by reference herein in its entirety.

BACKGROUND

1. Technical Field

The present disclosure relates to a display system that can be applied to a wearable display device such as a head-mounted display (HMD) that presents a virtual image to a user, for example. The present disclosure also relates to a display method in the display system and a display program for the display system.

2. Related Art

For example, a display device of a head-mount type as a head-mounted display (HMD) that displays a virtual image is known in which when the user faces the operating part to operate a control part of the HMD, this state is detected and the visibility of the virtual image of the HMD is reduced (JP-A-2012-204998). In JP-A-2012-204998, in order to achieve the above-described object, a light receiving part and a light emitting part are provided on the HMD side and the control part side, and when the light receiving part is receiving light from the light emitting part, it is determined that the user of the HMD is about to operate the control part, and then, the display brightness of the HMD is reduced.

However, in JP-A-2012-204998, it is necessary to provide the light receiving part and the light emitting part on the HMD side and the control part side to make the above-described determination. Consequently, this may result not only in increase of components, but also in difficulty in placement of the light emitting part and the light receiving part in the case where an existing product such as a smartphone is used on the control part side, and the like. JP-A-2012-204998 also discloses that the determination accuracy is increased by detecting the inclination of the head side; however, accurate detection may not be made when, for example, the user (wearer) is lying or is sitting in a chair, i.e., when the posture is changed.

SUMMARY

A display system according to one aspect of the present disclosure includes a display device configured to display an image to be visually recognized by a user, an information processing device configured to connect to the display device, a first sensor provided at the display device and including a first geomagnetic sensor, the first sensor being configured to detect a posture of the display device, a second sensor provided at the information processing device and including a second geomagnetic sensor, the second sensor being configured to detect a posture of the information processing device, and a display control part configured to change a display mode of the display device in accordance with a relative positional relationship between the display device and the information processing device, the relative positional relationship being computed based on a detection result obtained by the first geomagnetic sensor and a detection result obtained by the second geomagnetic sensor.

DESCRIPTION OF EXEMPLARY EMBODIMENTS

First Embodiment

The following describes an example of a display system using a display method and a display program for the display system according to a first embodiment of the present disclosure with reference to the drawings.

Figure 1:
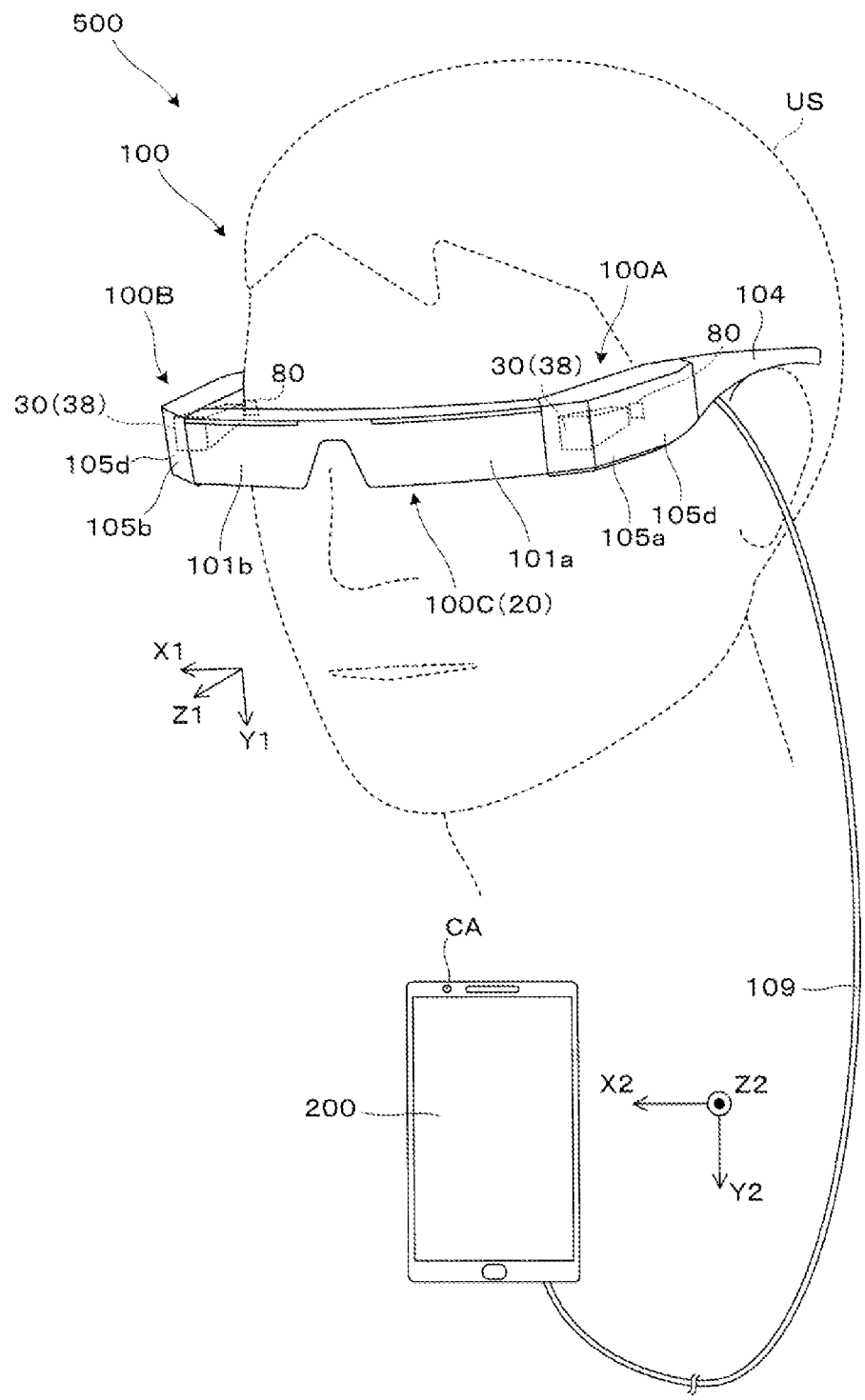
FIG. 1 is a perspective view for describing a use state of a display system according to a first embodiment.

As illustrated in FIG. 1 and the like, a display system 500 according to this embodiment includes a wearable display device 100 that is a display device, and an information processing device 200 that is connected to the wearable display device 100 through a cable 109.

The wearable display device 100 is a head-mounted display (HMD) having an eyeglass-like appearance and is an optical body portion for image formation. In FIG. 1 and the like, X1, Y1, and Z1 are orthogonal coordinate systems. The +X1 direction corresponds to a lateral direction in which the eyes of a user US or an observer US wearing the wearable display device 100 are aligned, the +Y1 direction corresponds to an downward direction orthogonal to the lateral direction in which both eyes of the observer US are aligned, and the +Z1 direction corresponds to a forward direction or a front direction with respect to the user US. When described as the directions in the wearable display device 100, the X1, Y1, and Z1 are as follows. First, the X1 axis corresponds to an axis along the direction in which two light-guiding members 10 constituting a first display device 100A and a second display device 100B are aligned. The Z1 axis corresponds to an axis along an emission direction of image light (picture light) from the light-guiding member 10. The Y1 axis corresponds to an axis orthogonal to both the X1 axis and the Z1 axis.

The information processing device 200 is a device that performs various processes on the image to be projected on the wearable display device 100, and outputs a picture signal or the like to the wearable display device 100. The information processing device 200 can be configured by downloading a required application to a smartphone (smart phone) or the like, for example. In FIG. 1 and the like, the X2, Y2, and Z2 are orthogonal coordinate systems. The +X2 direction and the +Y1 direction correspond to the short side direction and the long side direction of a rectangular display (operation image display part) DS in the information processing device 200, and the +Z2 direction is a direction perpendicular to the +X2 direction and the +Y2 direction and corresponds to the picture light emission direction from a display DS.

Note that the cable 109 that connects the wearable display device 100 and the information processing device 200 can be composed of, for example, a USB-Type-C connector. In response to reception of picture data transmitted in an alternate mode of the USB-Type-C, a picture display of a content image in the wearable display device 100 is achieved based on the picture signal from the information processing device 200 composed of a smartphone or the like.

As illustrated in FIG. 1 and the like, the wearable display device 100 is an optical device that can achieve not only visual recognition of a virtual image, but also observation of an external image in a see-through manner for the user (observer) US using the wearable display device 100. As described above, the wearable display device 100 can be communicatively coupled to the information processing device 200 through the cable 109, and can form a virtual image corresponding to a picture signal input from the information processing device 200, for example. Note that, while the wearable display device 100 is described here as an optical device or a virtual display device configured for visual recognition of a virtual image as described above, the entirety of a display system 500 including, in addition to the wearable display device 100 as the optical device, the part of the information processing device 200 or the part corresponding to it can also be construed as a wearable display device or an HMD.

The wearable display device 100 includes the first display device 100A and the second display device 100B. The first display device 100A and the second display device 100B are parts that form a virtual image for the left eye and a virtual image for the right eye, respectively. The first display device 100A for the left eye includes a first virtual image forming optical part 101a that covers the front of the eye of the user (observer) US in a manner allowing for see-through viewing, and a first image forming body part 105a that forms image light. The second display device 100B for the right eye includes a second virtual image forming optical part 101b that covers the front of the eye of the user US in a manner allowing for see-through viewing, and a second image forming body part 105b that forms image light. In other words, the first display device 100A and the second display device 100B display images corresponding to the left and right eyes.

Temples 104, which are temple parts extending rearward from the sides of the head, are attached to the rear of the first and second image forming main bodies 105a and 105b, and the temples 104 make contact with the ears, temples, and the like of the user to ensure the mounting state of the wearable display device 100. The first image forming body part 105a includes a display element 80, a lens barrel 38, and the like in a cover-shaped outer case 105d, and likewise, the second image forming body part 105b includes the display element 80, the lens barrel 38, and the like in the outer case 105d. Specific examples of these optical configurations will be described later with reference to FIG. 8.

As described above, the information processing device 200 can be configured by, for example, downloading a required application to a smartphone, but the configuration of the information processing device 200 is not limited to a smartphone, and various devices such as a PDA terminal, a tablet personal computer, and a notebook personal computer can be applied. Here, with the information processing device 200 composed of a smartphone, the image displayed on the wearable display device 100 can be adjusted by operating the touch panel by the user US and the like, and information processing such as various image processing is performed by a built-in circuit board or the like. In addition, the display DS of the information processing device 200 functions as an operation image display part for performing various displays, and touch panel operations. In other words, the information processing device 200 is also an input device that receives input operations of the user US. In this case, the wearable display device 100 allows for a see-through observation of external images, and as such the user US confirms the screen of the display DS through the screen of the wearable display device 100.

Figure 7:
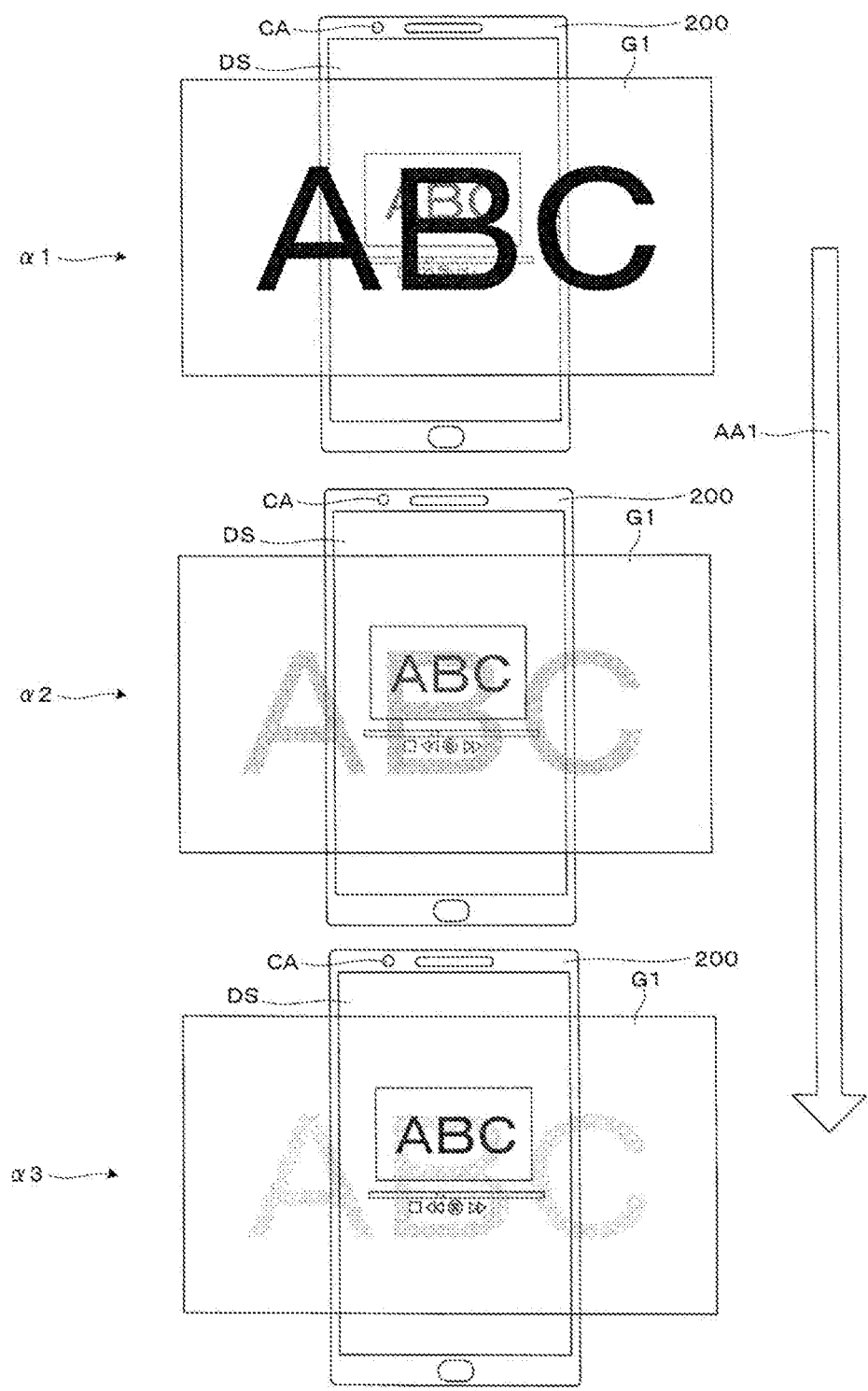
FIG. 7 is a conceptual diagram illustrating an example of a change of a display mode of the display device.

In the above configuration, when the user US operates the information processing device 200, the display image of the wearable display device 100 may overlap and hinder the image on the display DS of the information processing device 200 (see FIG. 7). In order to avoid such a situation, in the display system 500 according to this embodiment, whether the user US is in a state of operating the information processing device 200 is automatically determined by detecting the relative positional relationship between the wearable display device 100 and the information processing device 200, and the display mode of the wearable display device 100 is automatically changed in accordance with the determination result. More specifically, in the display system 500, in the case where it is detected that the wearable display device 100 and the information processing device 200 are facing each other (see, for example, FIG. 4) as the relative positional relationship, the display brightness of the wearable display device 100 is automatically adjusted so that the user US can concentrate his or her attention on the screen projected on the display DS of the information processing device 200.

A configuration example of the display system 500 of this embodiment is described below with reference to the block diagram of FIG. 2 and the like.

Figure 2:
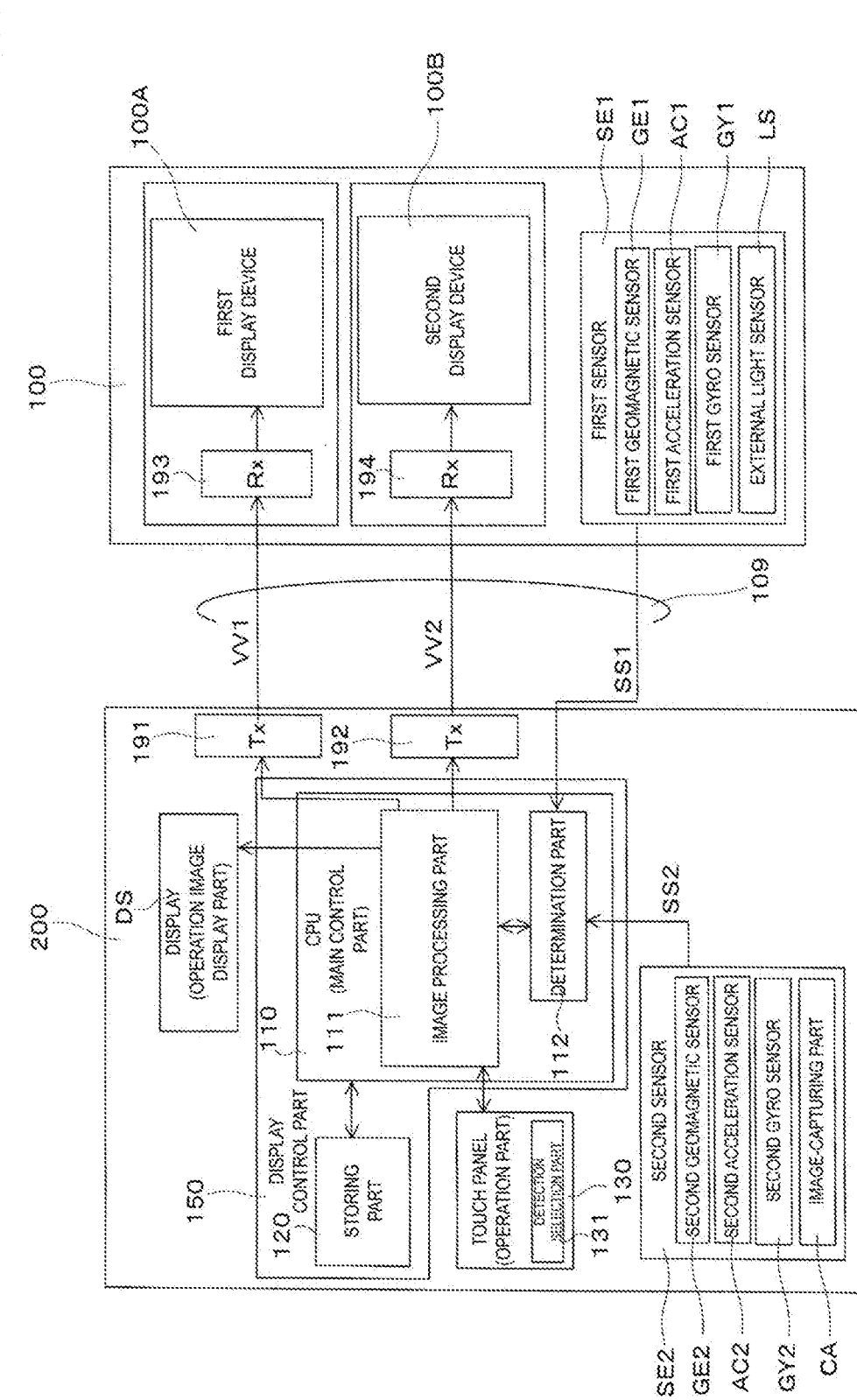
FIG. 2 is a block diagram for describing a configuration example of the display system.

FIG. 2 is a block diagram illustrating an example of a configuration of the display system 500 illustrated in FIG. 1.

First, a configuration of the wearable display device 100 of the display system 500 is described. As illustrated in the drawing and as described above, the wearable display device 100 includes the first display device 100A and the second display device 100B that display an image to be visually recognized by the user US (see FIG. 1). In addition, the wearable display device 100 includes reception parts (Rx) 193 and 194 that function as receivers for serial transfer between the information processing device 200 and the first and second display devices 100A and 100B through the cable 109. Specifically, in the wearable display device 100, the first and second display devices 100A and 100B perform image formation on the basis of left eye image data and right eye image data received by the reception parts (Rx) 193 and 194, respectively.

In addition to the above, the wearable display device 100 includes a first sensor SE1 composed of various sensors for the purpose of detecting its own orientation or posture. More specifically, the first sensor SE1 includes a first geomagnetic sensor GE1, a first acceleration sensor AC1, a first gyro sensor (angular velocity sensor) GY1, and an external light sensor LS.

In the first sensor SE1, the first geomagnetic sensor GE1 is a sensor intended to measure the magnitude and direction of the magnetic field. The first geomagnetic sensor GE1 is composed of, for example, a three-axis geomagnetic sensor, and can determine an azimuth by measuring the direction of the magnetic field. In other words, the orientation or posture of the wearable display device 100 can be determined. Further, in other words, the first sensor SE1 is a sensor that is provided in the wearable display device 100, includes the first geomagnetic sensor GE1, and detects the posture of the wearable display device 100. In addition, in the first sensor SE1, the first acceleration sensor AC1 and the first gyro sensor GY1 are, for example, a three-axis acceleration sensor and a three-axis gyro sensor, and the posture of the wearable display device 100 can be more accurately detected by using the first acceleration sensor AC1 and the first gyro sensor GY1 together with the first geomagnetic sensor GE1. In the above-described manner, the first sensor SE1 constitutes a motion sensor having nine axes in its entirety.

In addition to the above, an external light sensor (illuminance sensor) LS is provided as a part of the first sensor SE1. The external light sensor LS is composed of, for example, an ambient light sensor (ALS) and measures the ambient light intensity of the user US (see FIG. 1). Thus, the external light sensor LS can detect the amount of light entering the eye of the user US when disposed in the orientation toward the +Z1 direction corresponding to the forward direction or the front direction with respect to the user US, for example.

The first sensor SE1 outputs, to the information processing device 200 through the cable 109, various information SS1 related to the posture detection of the wearable display device 100 acquired by the first geomagnetic sensor GE1 and the like. Note that the information SS1 is used especially in a determination part 112 described later in the information processing device 200.

Next, a configuration of the information processing device 200 of the display system 500 is described. As illustrated in the drawing and as described above, the information processing device 200 is composed of a smartphone or the like. While receiving an instruction from the user US (see FIG. 1), the information processing device 200 performs various information processing including image processing and performs various display operations. For this purpose, the information processing device 200 includes a CPU (main control part) 110, a storing part 120, a touch panel 130 serving as an operation part, and transmission parts (Tx) 191 and 192 in addition to the display DS. Among them, the CPU (main control part) 110 and the storing part 120 function as a display control part 150 that sets the display mode of the wearable display device 100, which is a display device.

The storing part 120 is composed of various storage devices and the like, and various computer programs and various data are stored in the storing part 120. Not that the details will be exemplified later with reference to FIG. 3.

A CPU 110 functions as an image processing part 111 that performs image processing by reading out and executing a computer program or data from the storing part 120, and as a determination part 112 that determines whether the user US is in a state of operating the information processing device 200, and the like. In particular, in this embodiment, the CPU 110 and the storing part 120 cooperate to function as the image processing part 111 and the determination part 112, and thus function as the display control part 150 that controls the change of the display mode of the wearable display device 100 on the basis of the determination results regarding the posture of the wearable display device 100 and the information processing device 200. Note that, in addition to the above, the CPU 110 functions also as an input signal processing part and the like. In other words, the CPU 110 functions as a main control part that manages the entire control of the wearable display system 500 by performing various computational processing.

The display DS is a display device that emits image light to form a display image in the information processing device 200, and is composed of, for example, an organic EL display panel, a panel for an LCD, or the like.

The touch panel 130, which is the operation part, is an external input receiving device (input device) that is composed of a transparent member provided on the display DS and is operated by the user (observer) US on the display DS. The touch panel 130 receives command signals for various operations corresponding to the operation input of the operator US. Note that, in addition to each part for receiving the above-described various operation commands, the touch panel 130 may be provided with a detection selection key (detection selection part) 131 that makes it possible to select whether to use the detection result regarding the posture of the wearable display device 100 and the like.

The transmission parts 191 and 192 transmit various data, including a picture signal generated by the CPU 110, to the first and second display devices 100A and 100B, respectively, of the wearable display device 100. In other words, to function as transceivers for serial transmission between the information processing device 200 and the first and second display devices 100A and 100B through the cable 109, the transmission parts 191 and 192 transmit image information VV1, which is left-eye image data and image information VV2, which is right-eye image data, to the reception parts 193 and 194, respectively, of the wearable display device 100.

In addition to the above, the information processing device 200 further includes a second sensor SE2 composed of various sensors for the purpose of detecting its own orientation or posture. More specifically, the second sensor SE2 includes a second geomagnetic sensor GE2, a second acceleration sensor AC2, a second gyro sensor (angular velocity sensor) GY2, and an image-capturing part (camera) CA.

In the second sensor SE2, the second geomagnetic sensor GE2 is a sensor intended to measure the magnitude and direction of the magnetic field. The second geomagnetic sensor GE2 is composed of, for example, a three-axis geomagnetic sensor, and can determine an azimuth by measuring the direction of the magnetic field. In other words, the orientation or posture of the information processing device 200 can be determined. Further, in other words, the second sensor SE2 is a sensor that is provided in the information processing device 200, includes the second geomagnetic sensor GE2, and detects the posture of the information processing device 200. In addition, in the second sensor SE2, the second acceleration sensor AC2 and the second gyro sensor GY2 are, for example, a three-axis acceleration sensor and a three-axis gyro sensor, and the posture of the information processing device 200 can be more accurately detected by using the second acceleration sensor AC2 and the second gyro sensor GY2 together with the second geomagnetic sensor GE2. In the above-described manner, the second sensor SE2 constitutes a motion sensor having nine axes in its entirety.

In addition to the above, an image-capturing part (camera) CA is provided as the second sensor SE2. The image-capturing part CA is an image-capturing camera composed of a solid-state image-capturing element such as a CCD or a CMOS. For example, as illustrated in FIG. 1, the image-capturing direction of the image-capturing part CA can be aligned with the display direction of the display DS by employing the in-camera of the camera originally built in the smartphone.

The second sensor SE2 outputs, to the display control part 150, various information SS2 related to the posture detection of the information processing device 200 acquired by the second geomagnetic sensor GE2 and the like. The information SS2 is used in the determination part 112.

In the above configuration, the CPU 110 as the determination part 112, or by extension, the display control part 150 computes a relative positional relationship between the wearable display device 100 and the information processing device 200, or in other words, the posture (orientation) of the information processing device 200 with respect to the posture (orientation) of the wearable display device 100 on the basis of the detection result obtained by the first geomagnetic sensor GE1 and the detection result obtained by the second geomagnetic sensor GE2, and changes the display mode of the wearable display device 100 in accordance with the relative positional relationship between the computed wearable display device 100 and the information processing device 200. Specifically, on the basis of the information SS1 and SS2 from the first and second sensors SE1 and SE2, the determination part 112 determines whether the relative positional relationship is a predetermined positional relationship for changing the display mode of the wearable display device 100, or in other words, the display system 500 determines whether there is a situation where the user US operates the information processing device 200 with the wearable display device 100 and the information processing device 200 facing each other. Further, on the basis of the determination result, the display system 500 performs an operation of gradually reducing the display brightness of the wearable display device 100 as a mode of changing the display mode, for example.

In order to achieve the above-described operations, the display control part 150, i.e., the CPU 110 and the storing part 120, of the display system 500 are provided with various programs and data, and a structure for performing computational processing based on the same.

Figure 3:
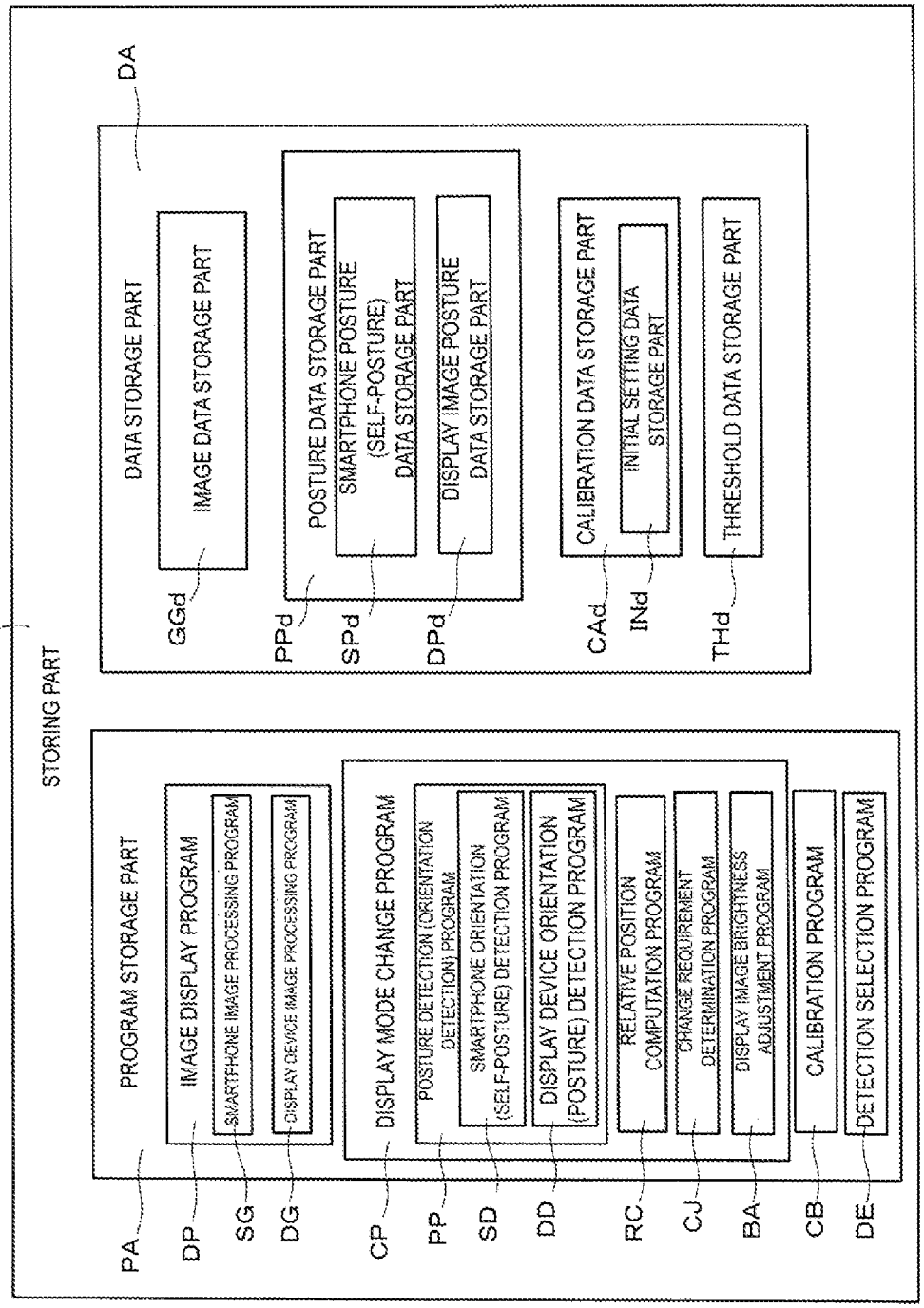
FIG. 3 is a block diagram for describing a configuration example of a storing part of the information processing device.

An example of various programs and data stored in the storing part 120 is described below with reference to FIG. 3. FIG. 3 is a block diagram for describing a configuration example of the storing part 120 in the information processing device 200 constituting the display system 500 in FIG. 2.

In an example illustrated in FIG. 3, the storing part 120 includes a program storage part PA that stores various programs, and a data storage part DA that stores various data.

Various programs stored in the program storage part PA are described below. The program storage part PA stores, for example, an image display program DP for performing processing related to normal image display, and a display mode change program CP for changing the display mode in accordance with the posture detection at the first and second sensors SE1 and SE2.

First, the image display program DP includes, for example, a smartphone image processing program SG for performing processing related to an image display of a normal case in the display DS of the information processing device 200 composed of a smartphone, and a display device image processing program DG for performing processing related to an image to be visually recognized by the user US in a normal case in the wearable display device 100.

On the other hand, the display mode change program CP includes, for example, an posture detection (orientation detection) program PP, a relative position computation program RC, a change requirement determination program CJ, and a display image brightness adjustment program BA, and can handle various processes related to the display mode change.

A posture detection program PP is a program for performing posture detection of the wearable display device 100 and the information processing device 200, and includes a smartphone orientation (self-posture) detection program SD for detecting the posture of the information processing device 200 on the basis of information from the second sensor SE2, and a display device orientation (posture) detection program DD for detecting the posture of the wearable display device 100 on the basis of information from the first sensor SE1.

The relative position computation program RC is a program for calculating a relative positional relationship between the wearable display device 100 and the information processing device 200 on the basis of their postures (orientations) detected using the posture detection program PP.

The change requirement determination program CJ is a program for determining whether to change the display mode of the wearable display device 100 on the basis of the computation result (calculation result) using the relative position computation program RC.

The display image brightness adjustment program BA is a program for adjusting the brightness of the display image of the corresponding wearable display device 100 in the case where the determination result using the change requirement determination program CJ requires a change.

Note that, in addition to the above, a calibration program CB and a detection selection program DE may be stored in the program storage part PA. The calibration program CB is a program for performing a calibration that is set in advance by the user US by himself or herself as an initial setting about a state where the wearable display device 100 and the information processing device 200 face each other. The detection selection program DE is a program DE for making it possible to select whether to use the display mode change in accordance with the posture detection at the first and second sensors SE1 and SE2.

Various data stored in the data storage part DA is described below. For example, the data storage part DA includes, in addition to an image data storage part GGd that stores various image data including data about a standardized image for use in activation and the like, a posture data storage part PPd, a calibration data storage part CAd, a threshold data storage part THd for storing data of various threshold values, and the like. Note that as the threshold value stored in the threshold data storage part THd, various values and parameters may be employed in accordance with the accuracy and the like of each device and the like.

In the image data storage part GGd, various image data for performing normal image display based on the image display program DP, for example, at the time of activation or termination, and the like are recorded, for example.

The posture data storage part PPd is provided with a display image posture data storage part DPd and a smartphone-posture (self-posture) data storage part SPd for recording data related to the postures (orientations) of the wearable display device 100 and the information processing device 200 that are detected based on the posture detection program PP. In addition, in the posture data storage part PPd, the calculation results and determination results based on the relative position computation program RC and the change requirement determination program CJ are also recorded so as to be temporarily retained as necessary.

The calibration data storage part CAd stores various data required for calibration based on the calibration program CB. In addition, the calibration data storage part CAd is provided with an area of an initial setting data storage part INd, and various parameters of a case where a state where the wearable display device 100 and the information processing device 200 face each other is set in advance as an initial setting are retained in the initial setting data storage part Ind.

Various threshold data are stored in the threshold data storage part THd. The threshold value stored therein may be, for example, an angular range that defines a range for determining that the wearable display device 100 and the information processing device 200 are facing each other, and the like.

An example of an operation of changing the display mode of the wearable display device 100 when the display system 500 is used is described below with reference to FIGS. 4 to 7.

Figure 4:
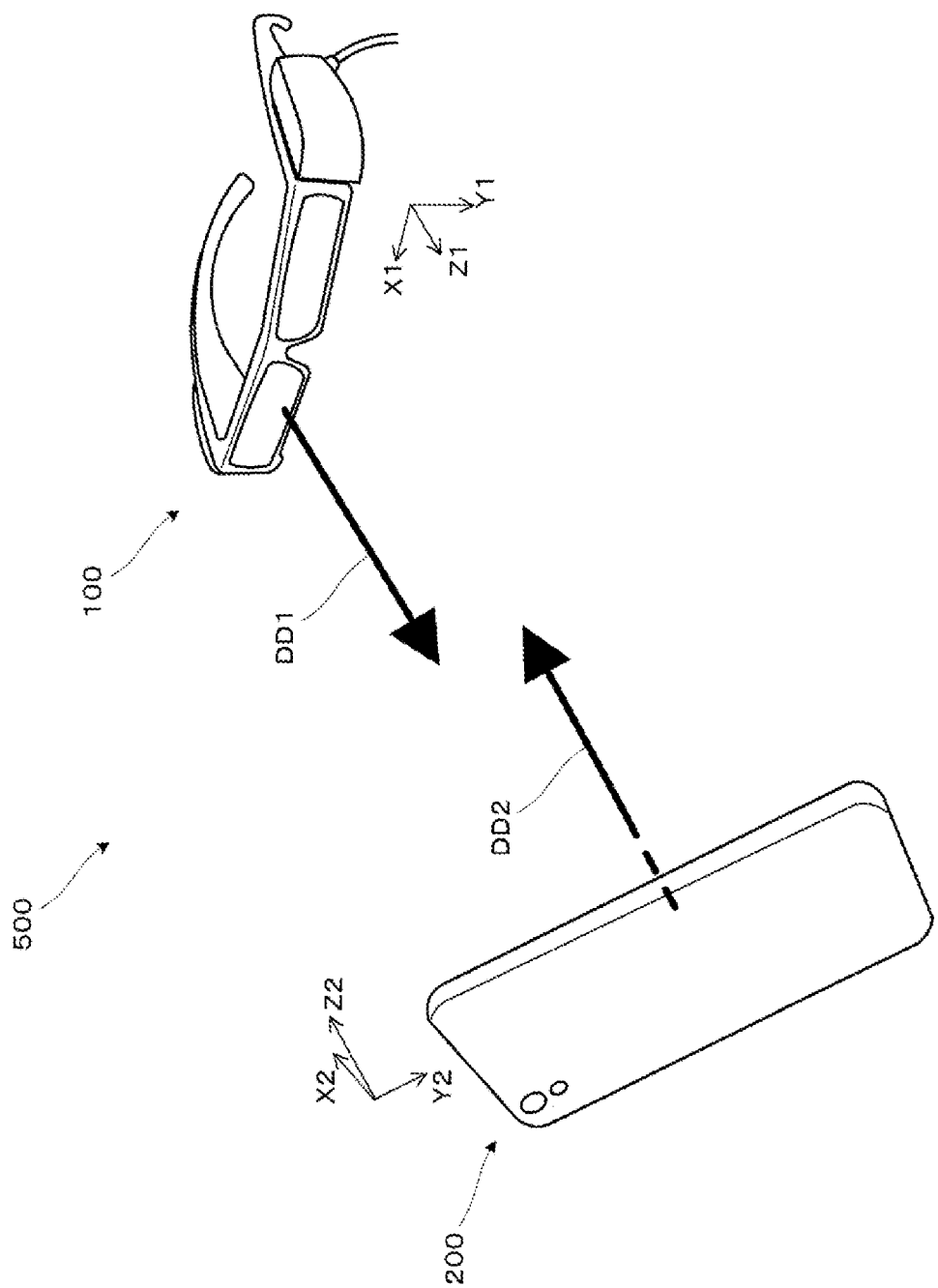
FIG. 4 is a perspective view conceptually illustrating an example of a use situation of a display device and an information processing device.
Figure 5:
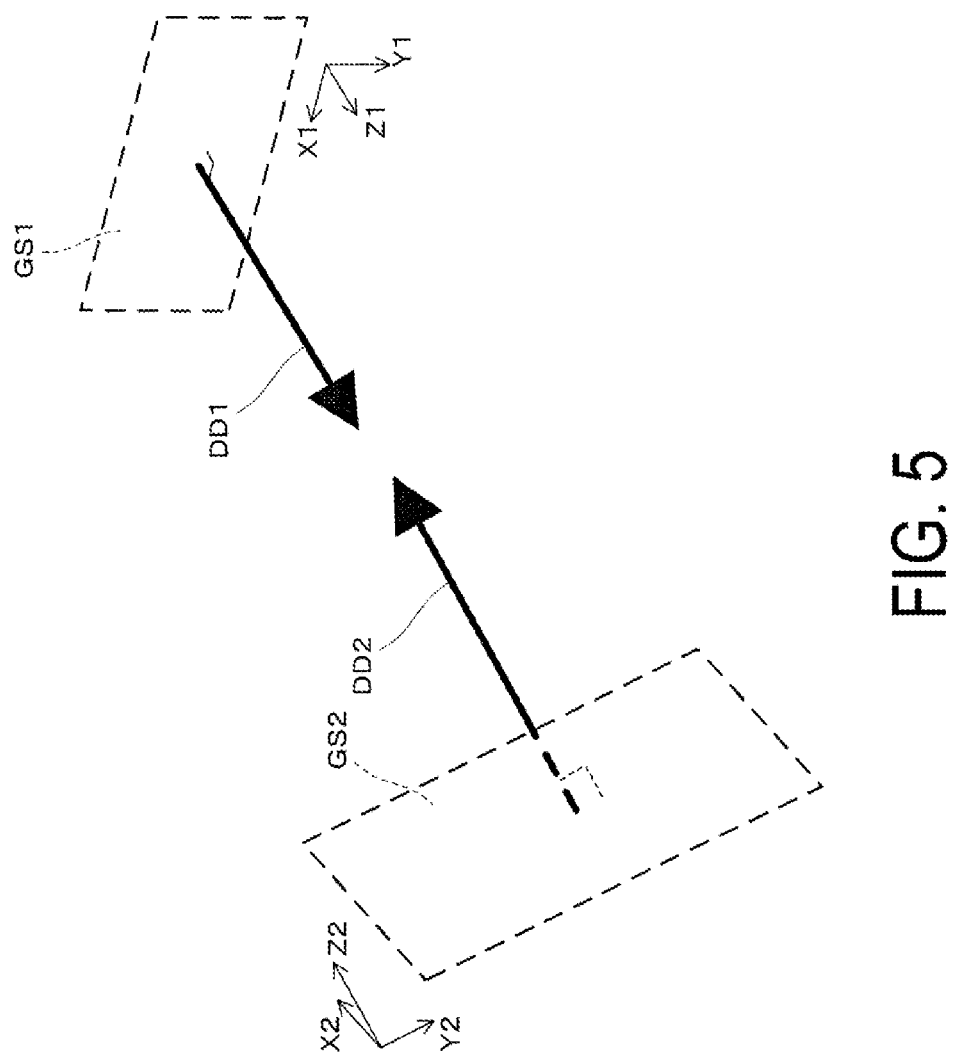
FIG. 5 is a conceptual diagram for describing a relative positional relationship between the display device and the information processing device in FIG. 4.
Figure 6:
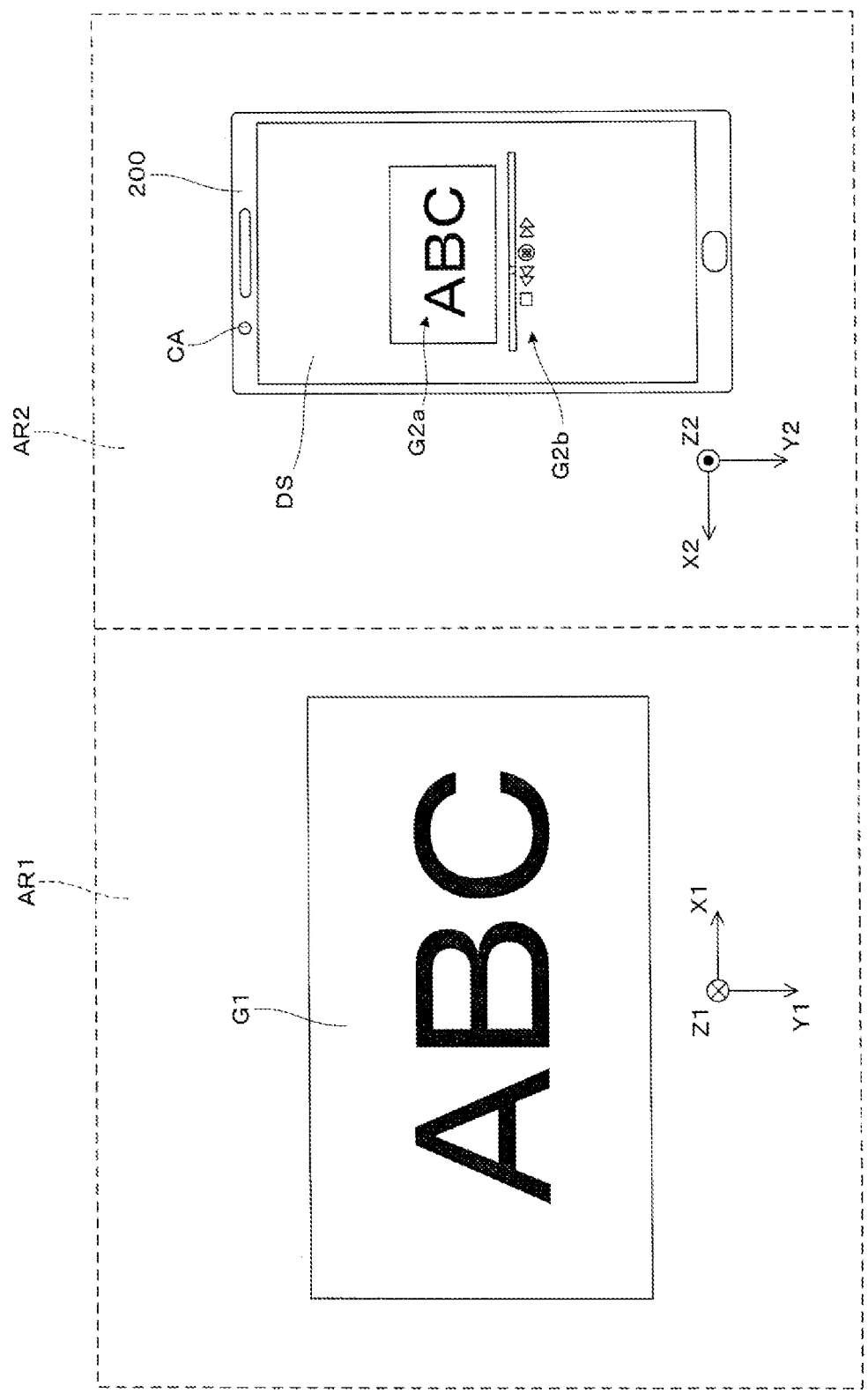
FIG. 6 is a conceptual diagram illustrating an example of display states of the display device and the information processing device.

FIG. 4 is a perspective view conceptually illustrating an example of a use situation of the wearable display device 100, which is a display device, and the information processing device 200. FIG. 4 illustrates a state where the wearable display device 100 and the information processing device 200 face each other. FIG. 5 is a conceptual diagram of an image surface and a normal direction thereof extracted to describe a relative positional relationship between the wearable display device 100 and the information processing device 200. FIG. 6 is a conceptual diagram illustrating an example of a display state of the wearable display device 100 as viewed from the user US, and an example of a display state of the information processing device 200 corresponding to the display state of the wearable display device 100. FIG. 7 is a conceptual diagram illustrating an example of how the display mode of the wearable display device 100 is changed when the displays illustrated in FIG. 6 appears to overlap in the positional relationship illustrated in FIG. 4 or 5.

As illustrated in FIGS. 4 and 5, first, as a precondition, whether the wearable display device 100 and the information processing device 200 are facing each other is determined on the basis of the normal vector of the image surface of each device. Specifically, first, a vector perpendicular to a first image surface GS1, which is the image surface of the image to be visually recognized by the wearable display device 100, is referred to as a normal vector DD1. Likewise, a vector perpendicular to a second image surface GS2, which is the image surface to be visually recognized by the display DS (see FIG. 6), which is the operation screen display part of the information processing device 200, is referred to as a normal vector DD2. In the case of this embodiment, in the orthogonal coordinate systems defined for the wearable display device 100, the +X1 direction and the +Y1 direction are an in-plane direction of the first image surface GS1, and the +Z1 direction is a direction parallel to the normal vector DD1 as illustrated in the drawings. In addition, in the orthogonal coordinate systems defined for the information processing device 200, the +X2 direction and the +Y2 direction are an in-plane direction of the second image surface GS2, and the +Z2 direction is a direction parallel to the normal vector DD2.

In the above configuration, when an angle θ (0°≤θ≤180°) between the normal vector DD1 and the normal vector DD2 is within a predetermined angle range, it is assumed that the wearable display device 100 and the information processing device 200 are facing each other. For example, when the angle is 160°≤θ≤180° or when the supplementary angle of the angle θ is used for definition and is 20 degrees or less, it is determined that they are facing each other in a situation where images exemplified in a state α1 in FIG. 7 are visually recognized.

Note that the normal vectors DD1 and DD2 can be computed based on the posture detections at the sensors SE1 and SE2 described above. In addition, as the method of computing the angle θ, for example, the angle may be computed by converting the normal vector DD1 and the normal vector DD2 based on information related to the azimuth detected for each of the wearable display device 100 and the information processing device 200, to common coordinates with the earth's axis (the earth's axis of rotation) as the absolute reference. In other words, when the components of the coordinates are denoted by $(a_1, b_1, c_1)$ and $(a_2, b_2, c_2)$, each θ is determined from the following equation.

$$\cos\theta = \frac{a_1 b_1 + a_2 b_2 + a_3 b_3}{\sqrt{a_1^2 + a_2^2 + a_3^2}\sqrt{b_1^2 + b_2^2 + b_3^2}}$$

An example of a case where the display mode of the wearable display device 100 is changed from the above-described calculation results is described below with reference to FIGS. 6 and 7.

First, it is assumed here that an image G1 as a virtual image such as that illustrated in a first region AR1 of FIG. 6 is visually recognized in the wearable display device 100, and that, as an image corresponding this, an image G2 such as that illustrated in a second region AR2 of FIG. 6 is displayed and can be visually recognized in the display DS of the information processing device 200. Specifically, here, while only a content image is visually recognized as the image G1 in the wearable display device 100, an operation image G2b is displayed as the image G2 in addition to an image portion G2a of a content image corresponding to the image G1 in the display DS as the operation screen display part in the information processing device 200. In this case, when a moving image or the like normally displayed by the wearable display device 100 is watched as it is, the operation of the information processing device 200 is not particularly required; however, when pausing or skipping the moving image or the like, the operation image G2b displayed on the display DS would be tapped. However, in the situation illustrated in FIG. 4, the first image surface GS1 and the second image surface GS2 overlap each other as viewed from the user US, and the user US would view the display DS through the image G1 as illustrated in the state α1 of FIG. 7, for example. As a result, if the state α1 is maintained, it is very difficult for the user US (see FIG. 1) to perform the operation. For this reason, in this embodiment, as described above, such a state is determined from the relative positional relationship between the wearable display device 100 and the information processing device 200 by detecting their orientations by the display control part 150 of the information processing device 200, and the display mode of the wearable display device 100 is changed. In the example of FIG. 7, the image G2 on the display DS is shifted to a state where it is easy to see by changing the display brightness of the image G1 such that the display brightness gradually decreases from the state α1 to the state α2, and further to the state α3, as indicated by an arrow AA1.

Note that the brightness may be further reduced from the state α3 such that the image G1 finally disappear. In other words, the display may be faded out as a change in the display mode of the wearable display device 100. In this case, through the fade-out, the image does not suddenly disappear and the display state is gradually changed, and thus, it is possible to make the user US aware that the display state of the wearable display device 100 is being changed. Even if the display state is changed at a timing that is not intended by the user US, the display state can be reset to the original display state before the display completely disappears when the user US notices it and performs an appropriate operation.

Regarding the extent of the reduction of the display brightness of the image G1, it is also conceivable to use the external light sensor (illuminance sensor) LS. Specifically, the display brightness of the image G1 may be reduced to the extent necessary in accordance with the brightness of the outside environment.

A specific example of an optical structure or the like of the wearable display device 100 that forms a virtual image as described above is described below with reference to FIG. 8 and the like.

Figure 8:
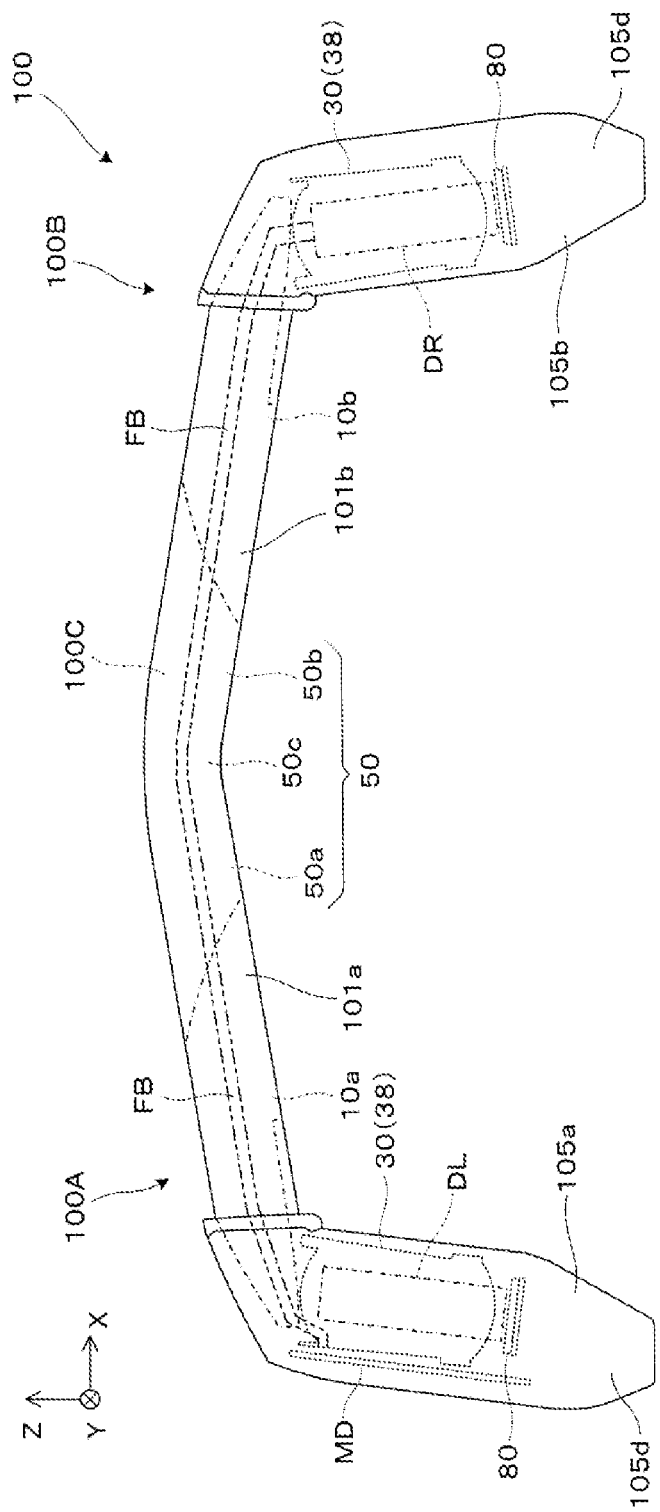
FIG. 8 is a plan view illustrating an optical configuration of the display device.
Figure 9:
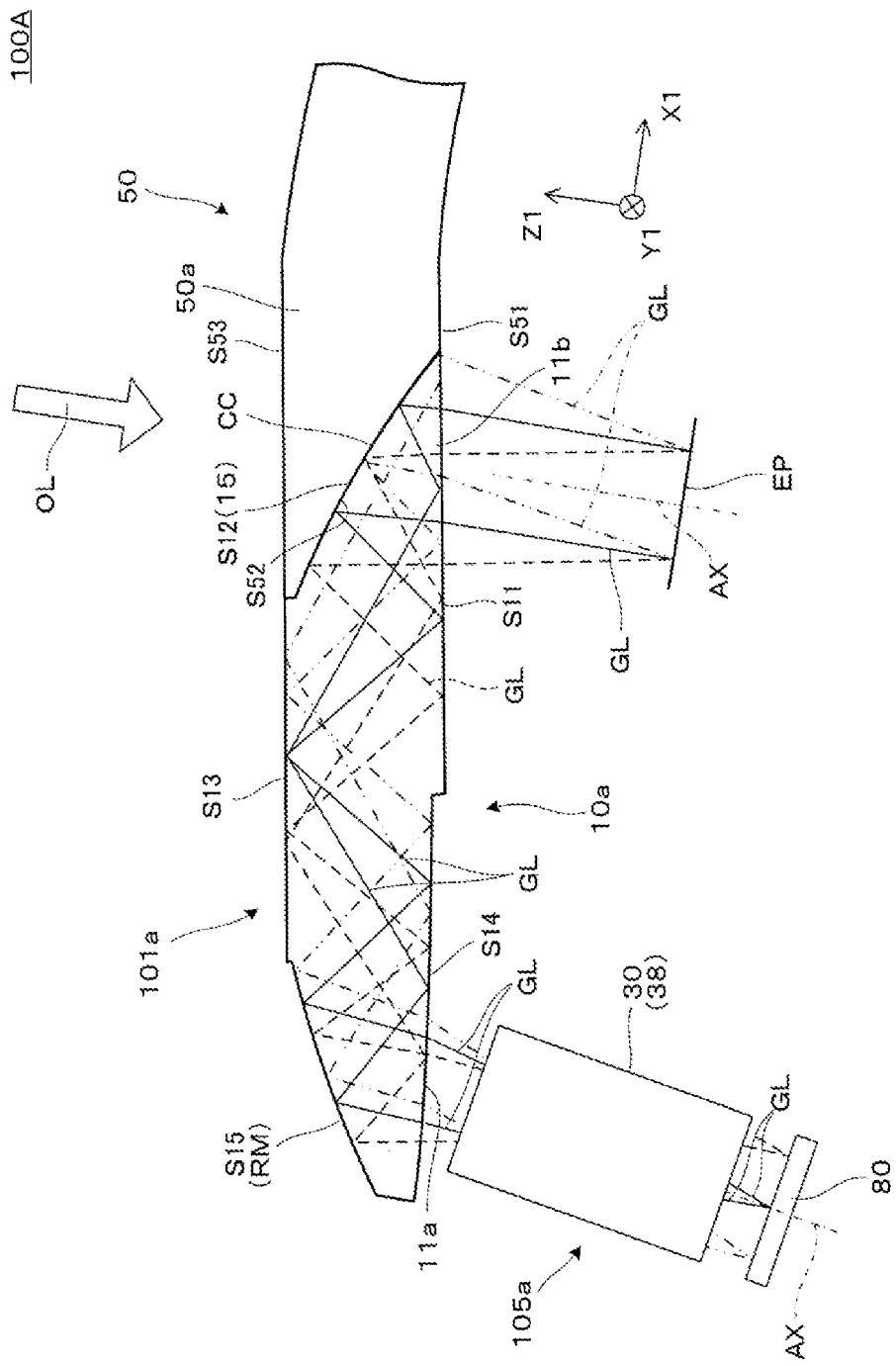
FIG. 9 is a plan view for describing an optical structure of the display device.

FIG. 8 is a plan view illustrating an optical configuration of the wearable display device 100, which is a display device. FIG. 9 is a plan view for describing an optical structure of the wearable display device 100.

First, as illustrated in FIG. 8, the first and second virtual image forming optical parts 101a and 101b include first and second light-guiding members 10a and 10b, respectively, which are light guides formed of a resin material or the like. The first and second virtual image forming optical parts 101a and 101b are connected by a central member 50 at the center to form a transparent light-guiding unit 100C as an integral member. In other words, the transparent light-guiding unit 100C is a light-guiding unit that includes the pair of light-guiding members 10a and 10b and the central member 50. The pair of light-guiding members 10a and 10b are a pair of optical members that contribute to the formation of a virtual image while internally propagating image light as components of the first and second virtual image forming optical parts 101a and 101b. The central member 50 is an integrally molded member formed of a resin material or the like and includes a pair of light transmission parts 50a and 50b and a bridge part 50c that connects the light transmission parts 50a and 50b. With the pair of light transmission parts 50a and 50b joined to the pair of light-guiding members 10a and 10b, central member 50 functions as a coupling member that couples the first display device 100A and the second display device 100B. More specifically, in the pair of light transmission parts 50a and 50b of the central member 50, the light transmission part 50a on one side is joined to the light-guiding member 10a, and the light transmission part 50b on the other side is joined to the light-guiding member 10b. Note that, in the illustrated example, in the central member 50, the portion from the bridge part 50c to the light transmission part 50a and the portion from the bridge part 50c to the light transmission part 50b are smoothly connected with no bent portion (bending portion) as illustrated in FIG. 4, for example. The absence of a portion such as a bent portion (bending portion) or a stepped portion avoids a double-vision of an external image.

Note that the transparent light-guiding unit 100C is supported by the outer cases 105d at both ends, i.e., on the outer end side of the light-guiding members 10a and 10b, as a composite light-guiding device 20 that provides the user US with a picture for both eyes through light guidance.

The first image forming body part 105a includes the display element 80, the lens barrel 38, a main circuit board MD, a left-eye circuit board DL, and the like in the cover-shaped outer case 105d. The main circuit board MD is connected to each portion through a flexible substrate FB as a cable. On the other hand, the second image forming body part 105b includes the display element 80, the lens barrel 38, a right-eye circuit board DR, and the like in the outer case 105d. Note that the outer case 105d is made of, for example, a magnesium alloy or the like.

For example, in the first image forming body part 105a, the display element 80 housed in the outer case 105d is a display device that emits image light to form an image corresponding to a virtual image for the left eye. The display element 80 is composed of, for example, an organic EL display panel, a panel for an LCD, or the like. A projection lens 30 emits image light from the display element 80, and constitutes a part of the image-capturing system in the first virtual image forming optical part 101a. As a part of the projection lens 30, the lens barrel 38 holds an image-forming optical element (not illustrated) constituting the projection lens 30. Note that, also in the second image forming body part 105b, the display element 80 and the projection lens 30 including the lens barrel 38 housed in the outer case 105d serve the same function to form an image corresponding to a virtual image for the right eye.

An optical structure of the wearable display device 100 is described below with reference to FIG. 9. FIG. 9 is a diagram illustrating a portion of the first display device 100A of the wearable display device 100, and especially describes an optical structure of the first virtual image forming optical part 101a. While the wearable display device 100 includes the first display device 100A and the second display device 100B (see FIG. 1 and the like) as described above, only the first display device 100A is described and the description of the second display device 100B is omitted since the first display device 100A and the second display device 100B have left-right symmetrical and equivalent structures. Note that first to fifth surfaces S11 to S15 having an optical function in light guidance of image light in the light-guiding member 10a are provided. Among them, the first surface S11 and the third surface S13 that occupy the primary position at the front of the eye are parallel flat surfaces.

The light transmission part 50a includes a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is located on a plane extended from the first surface S11 of the light-guiding member 10, the second transmission surface S52 is a curved surface that is joined to and integrated with the second surface S12, and the third transmission surface S53 is located on a plane extended from the third surface S13 of the light-guiding member 10.

The light-guiding member 10a of the first virtual image forming optical part 101a is joined to the light transmission part 50a through an adhesive layer CC. In other words, the second transmission surface S52 of the light transmission part 50a is disposed opposite the second surface S12 of the light-guiding member 10a and has the same shape as the second surface S12. The light-guiding member 10a and the light transmission part 50a have a structure in which a surface of the body member that provides a three-dimensional shape including an optical surface is covered with a thin hard coat layer. The body member of light-guiding member 10a and the light transmission part 50a is formed of a resin material with high optical transparency in a visible range, and is molded by injecting a thermoplastic resin into a mold and curing the resin, for example.

An overview of optical paths of image light GL is described below. The light-guiding member 10a guides, toward the eye of the user (wearer) US, the image light GL emitted from the projection lens 30 through reflection at the first to fifth surfaces S11 to S15 and the like. Specifically, the image light GL from the projection lens 30 first impinges on the part of the fourth surface S14 formed in a light incidence part 11a so as to be reflected by the fifth surface S15, which is an inner surface of a reflection film RM, and again impinges on the fourth surface S14 from the inner side so as to be totally reflected. Then, the image light GL impinges on the third surface S13 so as to be totally reflected, and impinges on the first surface S11 so as to be totally reflected. The image light GL totally reflected by the first surface S11 impinges on the second surface S12 and partially passes through a half mirror 15 provided in the second surface S12 while being partially reflected so as to again impinges on and passes through the part of the first surface S11 formed in a light emission part 11b. The image light GL having passed through the first surface S11 generally travels along an optical axis AX that is substantially parallel to the Z1 direction, and impinges on an exit pupil EP where the eye of the user US is located as a substantially parallel light flux. In other words, the user US observes an image with image light as a virtual image. In addition, in this case, the first image surface GS1 (see FIG. 5) serving as the image surface of the image visually recognized by the wearable display device 100 is a virtual plane of a virtual image and is parallel to the +X1 direction and the +Y1 direction, and the +Z1 direction is a direction parallel to the normal vector DD1.

In addition, the first virtual image forming optical part 101a is configured to allow the user US to visually recognize the image light with the light-guiding member 10a, and also allows the user US to observe an external image with little distortion in the state where the light-guiding member 10a and the light transmission part 50a are combined. At this time, since the third surface S13 and the first surface S11 are substantially parallel to each other, almost no aberration or the like occurs in extraneous light. In addition, the third transmission surface S53 and the first transmission surface S51 are substantially parallel to each other. Further, since the third transmission surface S53 and the first surface S11 are substantially parallel to each other, almost no aberration or the like occurs. Thus, the user US observes the external image with no distortion through the light transmission part 50a. In other words, the user US can visually recognize the image display by the information processing device 200 through the wearable display device 100 with no aberration or the like.

While the half mirror layer of the second surface S12, i.e., the half mirror 15, is a metal reflective film or a dielectric multilayer film in the above-described example, it is possible to replace it with a flat or curved hologram element, for example. The fifth surface S15 may also be composed of a hologram element as well as a mirror reflection surface.

An example of an operation of the display system 500 according to this embodiment is described below with reference to the flowchart of FIG. 10. Here, of operations of the display system 500, an operation of changing the display mode of the wearable display device 100 by determining the relative positional relationship between the wearable display device 100 and the information processing device 200 is mainly described.

When each part of the display system 500 is activated, the display control part 150 including the CPU 110 of the information processing device 200 first reads the posture detection program PP from the storing part 120 to perform the posture detection, starts the orientation detection of the head side, i.e., the wearable display device 100 side (step S101), and starts the orientation detection (or self-posture detection) of the smartphone side, i.e., the information processing device 200 side (step S102). Specifically, the orientation detection is performed at each of the sensors SE1 and SE2, and the detection results are stored in the posture data storage part PPd.

On the other hand, in the display control part 150, the CPU 110 reads the image display program DP from the storing part 120, performs various normal image processing as the image processing part 111, and starts normal display in the wearable display device 100 (step S103).

Next, the display control part 150 reads the relative position computation program RC from the storing part 120 and reads the result of the posture detection of step S101 and step S102 as necessary from the posture data storage part PPd to calculate the relative positional relationship between the wearable display device 100 and the information processing device 200 on the basis of their postures (orientations) (step S104). Further, in the display control part 150, the change requirement determination program CJ is read from the storing part 120, and thus the CPU 110 functions as the determination part 112 and determines whether to change the display mode of the wearable display device 100 on the basis of the computation result (calculation result) of step S104 (step S105). Specifically, at step S105, from the relationship of the direction of the orientation (axis) of the normal vector DD1 of the wearable display device 100 and the normal vector DD2 of the information processing device 200, it is determined whether they face each other and the angle θ is within a given range (i.e., an angle range falling within a predetermined threshold value).

When it is determined at step S105 that the they do not face each other or that they are not within the given range (within the angular range) (step S105: NO), the display control part 150 performs a setting such that the display brightness of the wearable display device 100 is maintained at a normal value (step S106a).

On the other hand, when it is determined at step S105 that they are facing each other and falling within the given range (within the angular range) (step S105: YES), the display control part 150 reads the display image brightness adjustment program BA from the storing part 120, and performs reduction setting for the brightness adjustment of the display image of the wearable display device 100, or in other words, performs the brightness adjustment of the display image of the wearable display device 100 (step S106b). Note that, as the processing at step S106b, the display mode is changed by the method exemplified in FIG. 7, for example.

After step S106a or step S106b, the display control part 150 determines whether the display operation started at step S103 has been terminated (step S107). When the display operation started at step S103 has been terminated (step S107: YES), the display control part 150 terminates all the operations. When the display operation started at step S103 has not been terminated (step S107: NO), the display control part 150 repeats the operations from step S104. Note that the operation of the orientation detection (posture detection) started at step S101 and step S102 is continued until the display operation is terminated and is updated each time.

An operation of a calibration in the display system 500 according to this embodiment is described below with reference to the flowchart of FIG. 11. As described above, in this embodiment, it is possible to perform a calibration for setting in advance a state where the wearable display device 100 and the information processing device 200 face each other. Here, in particular, it is assumed that an initial setting mode for performing an initial setting of a relative positional relationship for a determination as to whether to change the display mode of the wearable display device 100 is provided, and an operation related to the initial setting mode is described in FIG. 11. Regarding the start of the initial setting mode, a configuration is conceivable in which in the case where no setting by calibration has been made in the display system 500, a message regarding whether to start the initial setting mode is initially displayed when the display system 500 is activated, for example. Note that, in the case where a calibration in the initial setting mode has been made or in the case where a calibration setting that has already been made is held, the operation such as that illustrated in FIG. 10 is started.

Figure 11:
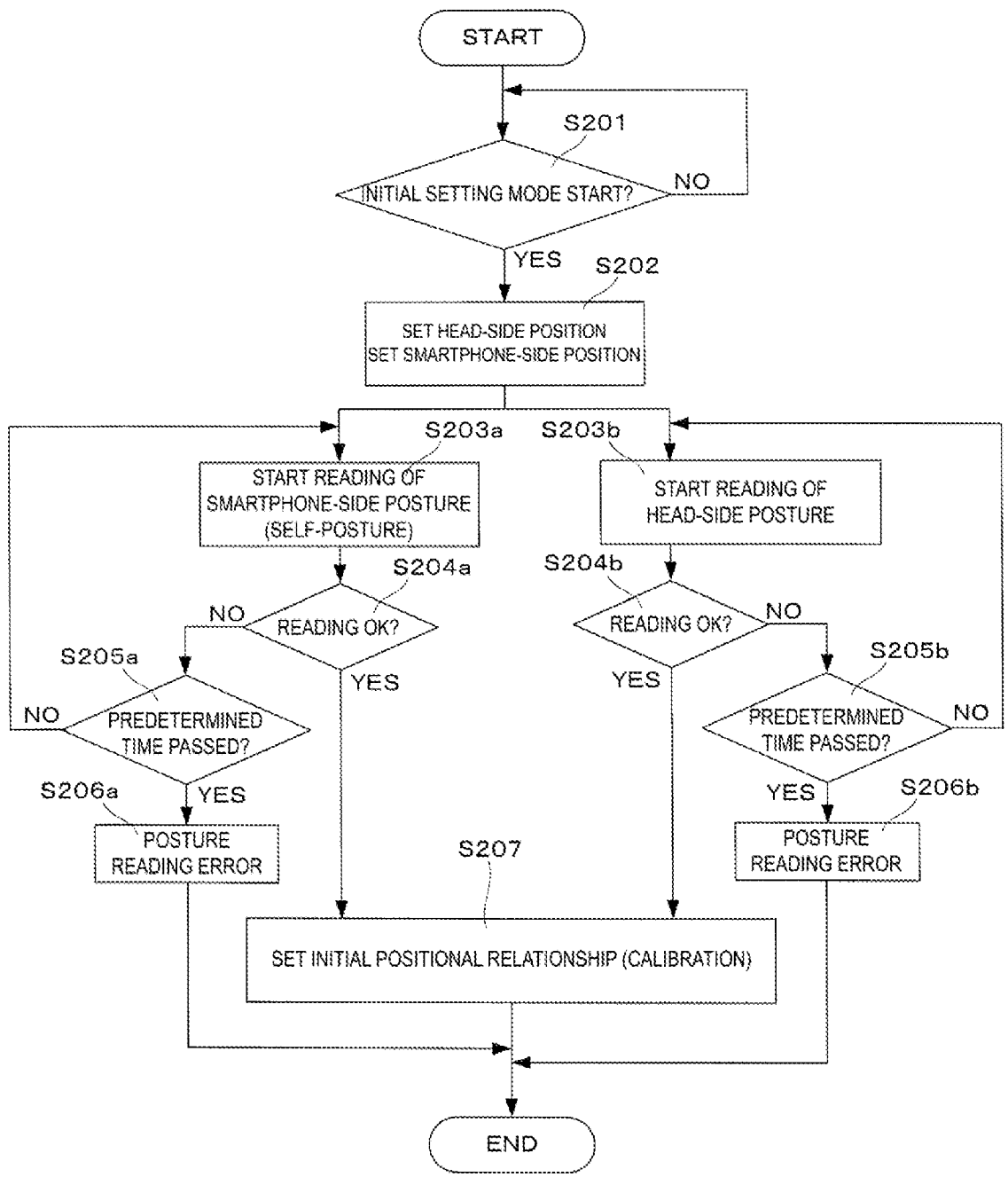
FIG. 11 is a flowchart for describing an example of a calibration in the display system.

In FIG. 11, when each part of the display system 500 is activated, the display control part 150 reads the calibration program CB from the storing part and confirms whether to start the initial setting mode (step S201). Specifically, whether the user US has instructed to perform the initial setting by calibration is confirmed. When receiving an instruction to start the initial setting mode at step S201 (step S201: YES), the display control part 150 prompts the user US to set the position of the head side, i.e., the wearable display device 100 and the position of the smartphone side, i.e., the information processing device 200 (step S202). For example, in order to determine the positional relationship between the wearable display device 100 and the information processing device 200, a message "Stay in your position for operating smartphone and press position determination button" or the like is displayed on the display DS of the information processing device 200 together with the position determination button.

At step S202, for example, when the position determination button is pressed and the position (posture) of the head side and the smartphone side is set, the display control part 150 starts the reading of the posture of the smartphone side, i.e., the posture of the information processing device 200 itself (step S203a), and starts the reading of the posture of the head side, i.e., the wearable display device 100 (step S203b). Specifically, at step S203a, acquisition of various information SS2 related to the posture detection of the information processing device 200 using the second sensor SE2 is started, and at step S203b, acquisition of various information SS1 related to the posture detection of the wearable display device 100 using the first sensor SE1 is started.

After the start of the reading at step S203a, the display control part 150 confirms whether the reading has been completed (step S204a). When the reading has not been completed at step S204a (step S204a: NO), the display control part 150 further confirms whether a predetermined time has passed after the start of reading (step S205a), and the reading is continued until the reading has been completed or the predetermined time has passed. In addition, the display control part 150 operates the same operation as the above-described operation also after the reading is started at step S203b (step S204b and step S205b).

At step S205a or step S205b, when the reading of the posture is not completed even after a predetermined time has passed (step S205a: NO or step S205b: NO), it is determined that a posture reading error has occurred and the operation is terminated. Note that, at this time, a message indicating failure of the initial setting may also be presented to the user US.

On the other hand, when the reading is completed at step S204a and step S204b (step S204a: YES and step S204b: YES), the display control part 150 sets and registers an initial positional relationship (step S207) by recording, in the initial setting data storage part INd provided in the calibration data storage part CAd, the read posture as an initial setting of the state where the wearable display device 100 and the information processing device 200 face each other, and then the series of processes is terminated.

As described above, the display system 500 according to this embodiment includes the wearable display device 100 that is a display device configured to display an image to be visually recognized by the user US, the information processing device 200 configured to connect to the wearable display device 100, the first sensor SE1 provided in the wearable display device 100 and including the first geomagnetic sensor GE1, the first sensor SE1 being configured to detect the posture of the wearable display device 100, the second sensor SE2 provided in the information processing device 200 and including the second geomagnetic sensor GE2, the second sensor SE2 being configured to detect the posture of the information processing device 200, and the display control part 150 configured to change the display mode of the wearable display device 100 in accordance with the relative positional relationship between the wearable display device 100 and the information processing device 200 computed based on the detection result obtained by the first geomagnetic sensor GE1 and the detection result obtained by the second geomagnetic sensor GE2.

In the display system 500, it is possible to determine that the user US of the display system 500 is about to operate the information processing device 200 as a control part for the image operation on the basis of the relative positional relationship between the wearable display device 100 and the information processing device 200, which can be determined by using the detection of the wearable display device 100 and the information processing device 200 at the first and second sensors SE1 and SE2. It is thus possible to achieve a mode in which the display mode of the wearable display device 100 is changed in accordance with the determination such that the brightness is reduced to increase the visibility of the information processing device 200. In addition, in the case of the above configuration, additional components such as a light receiving part, a light emitting part, or the like need not be provided in the wearable display device 100 or the information processing device 200 for the purpose of achieving the above-described object, and a sensor originally provided in a ready-made smartphone or the like may be used as the various sensors.

Figure 12:
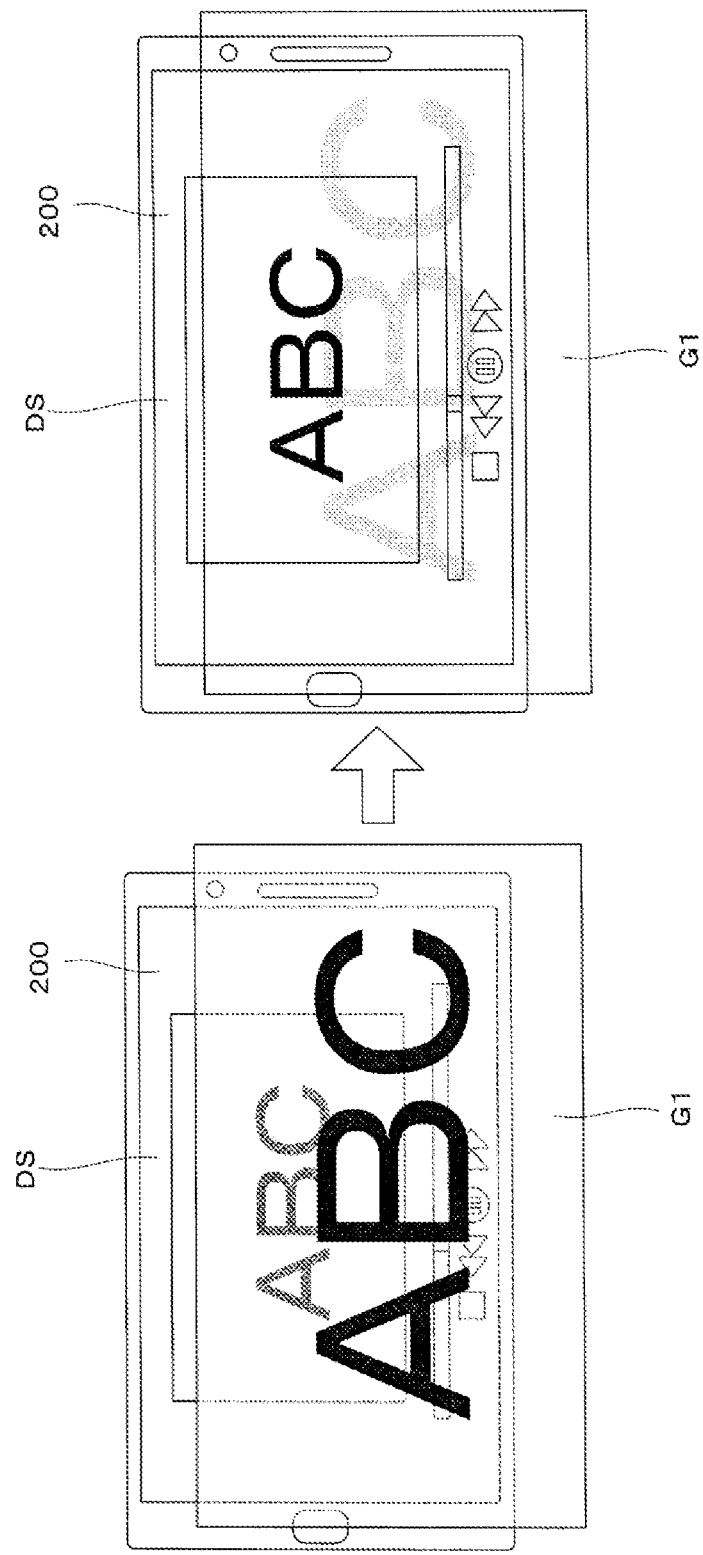
FIG. 12 is a conceptual diagram illustrating another example of a use situation of the display device.

Note that this embodiment is not limited to the above, and various modifications are conceivable. For example, even when the information processing device 200 (smartphone) is used in a landscape mode as illustrated in FIG. 12 corresponding to FIG. 7, it is possible to change the display mode in the same manner by detecting the state where the wearable display device 100 and the information processing device 200 are facing each other.

Figure 13:
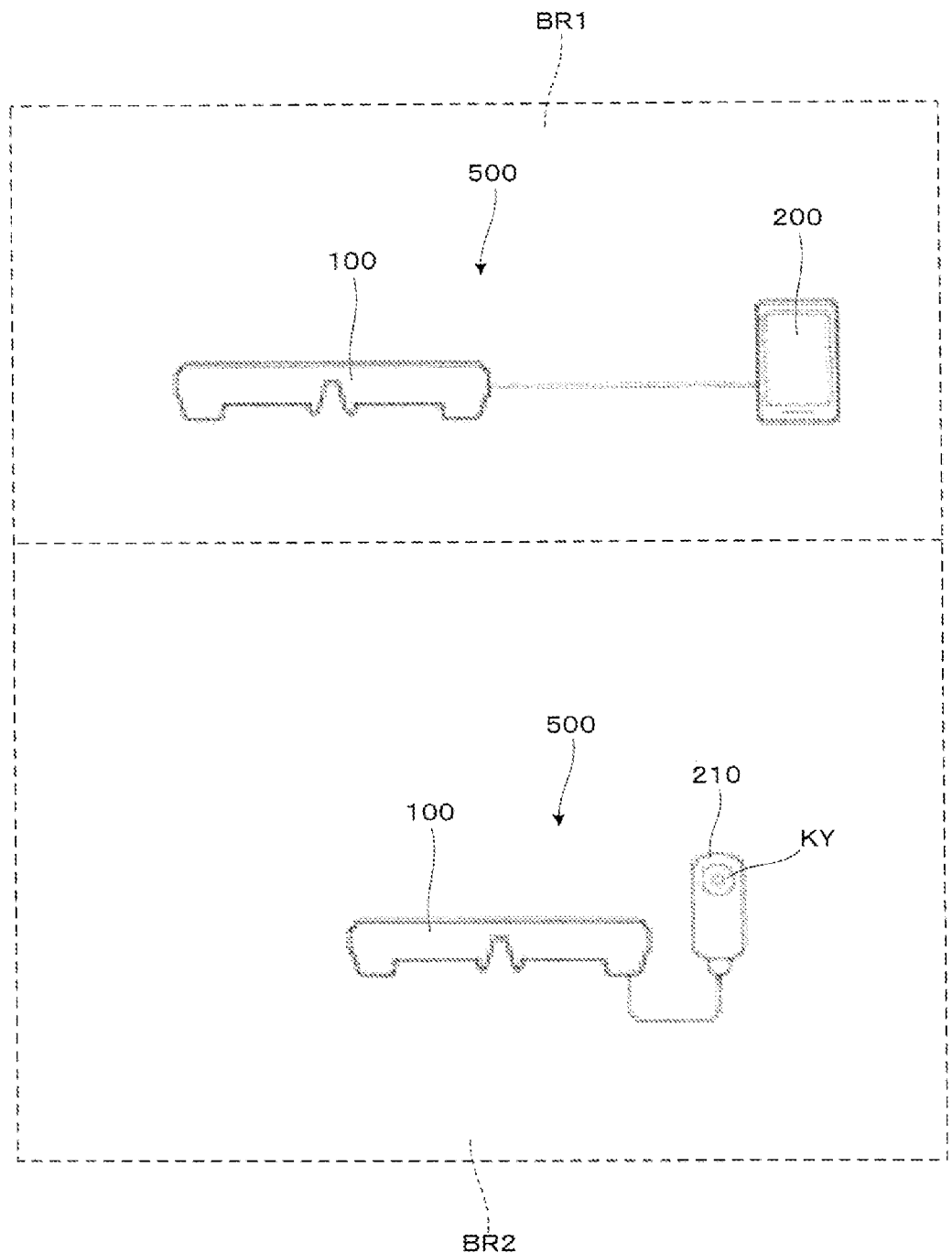
FIG. 13 is a conceptual diagram illustrating another configuration example of the display system.
Figure 14:
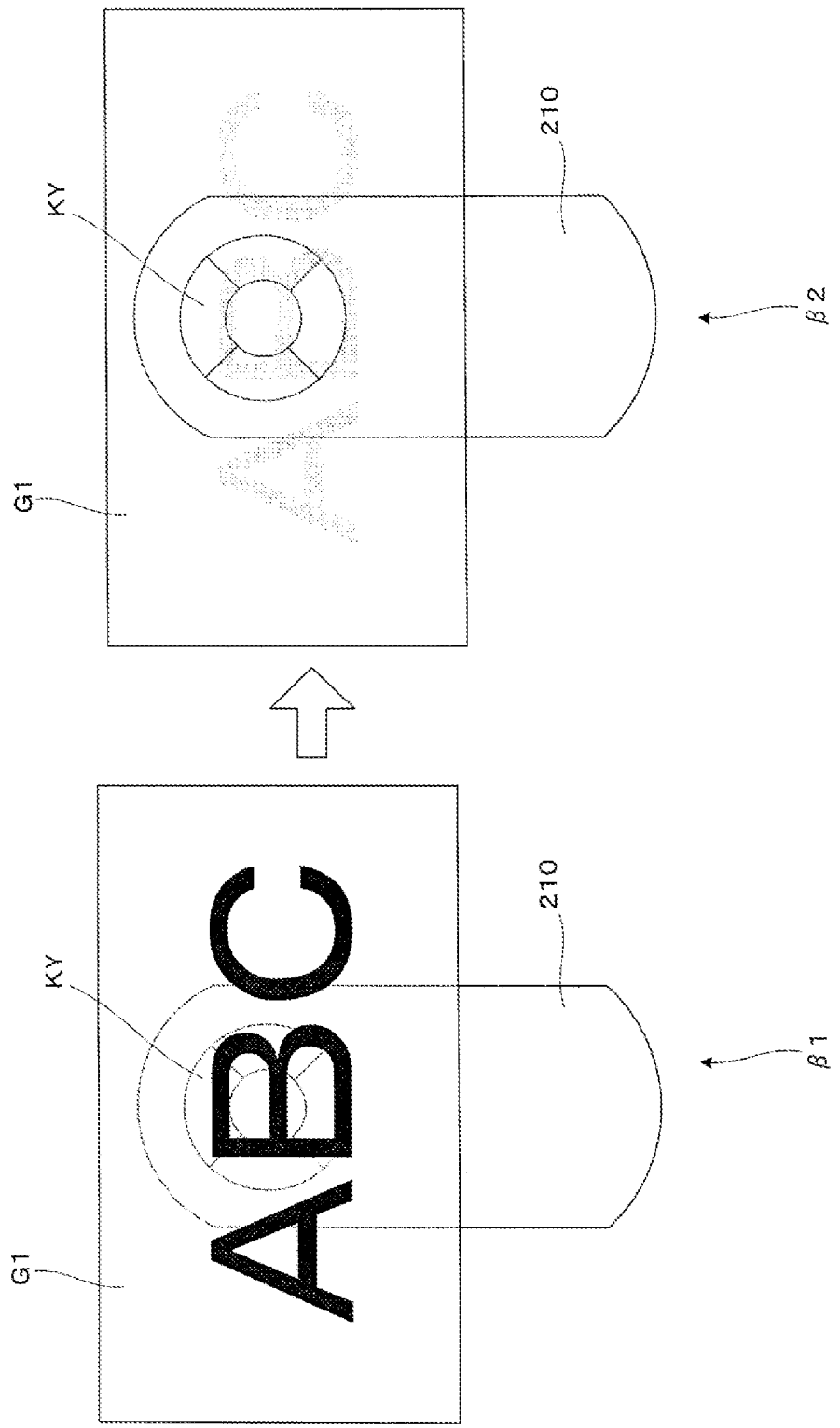
FIG. 14 is a conceptual diagram illustrating a change of the display mode of the display device of the example illustrated in FIG. 13.

In addition to the above-described configuration example illustrated in a first region BR1 in FIG. 13, the present disclosure can be applied also to the display system 500 including the wearable display device 100 and an information processing device 210 that does not include the image display part that displays the operation image but includes an actual operation key KY on the front surface as illustrated in a second region BR2, for example. In this case, as illustrated as a state β1 in FIG. 14 corresponding to FIG. 7 and the like for example, even when the image G1 overlaps and hinders the operation key KY, the visibility of the operation key KY can be increased by detecting that state, and reducing the display brightness of the image G1 as illustrated as a state β2.

Figure 10:
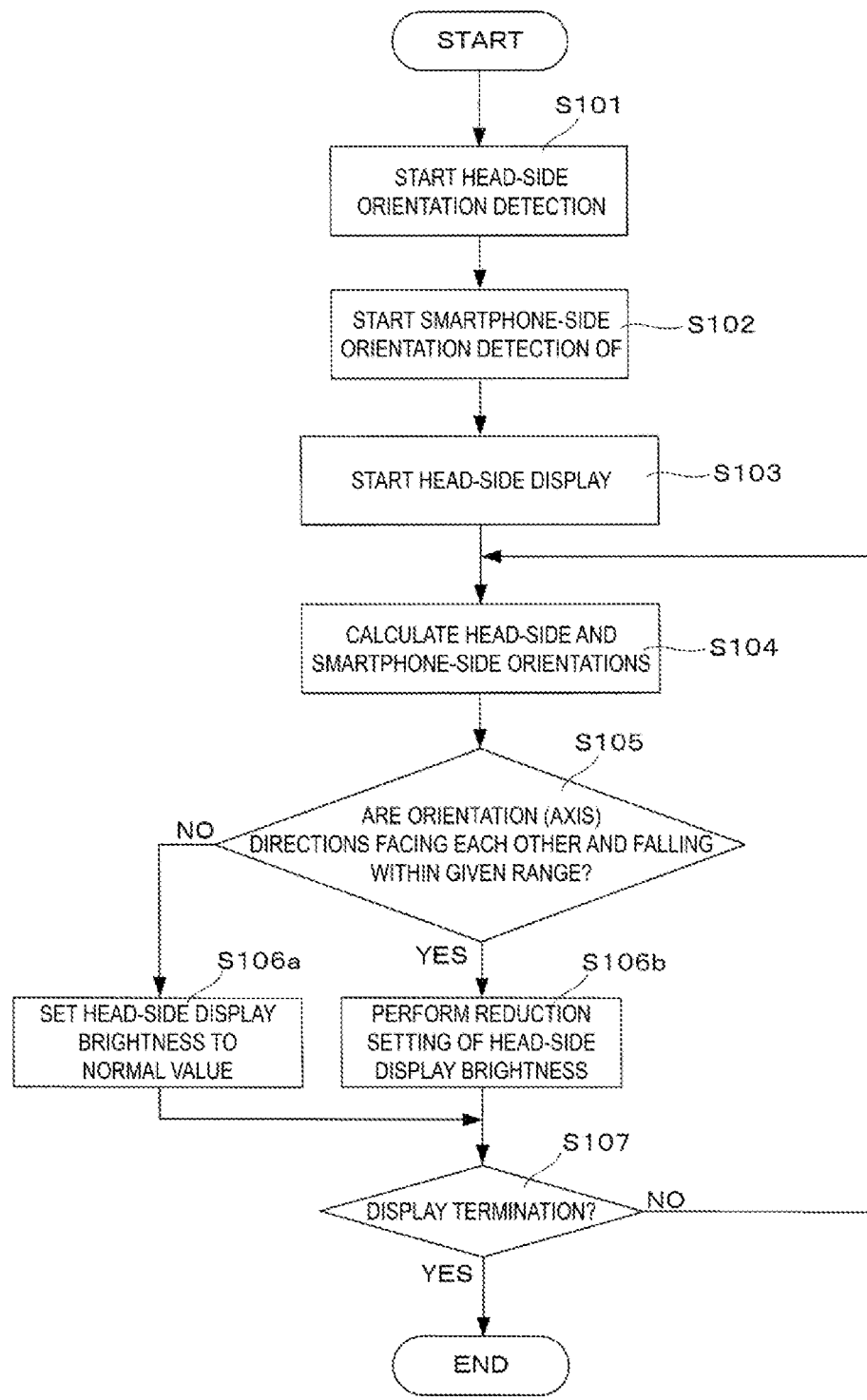
FIG. 10 is a flowchart for describing an example of an operation of the display system.

In addition, various modifications of the operation of changing the display mode of the wearable display device 100 described with reference to the flowchart of FIG. 10 are conceivable. For example, the case of FIG. 10 may be partially modified as illustrated in the flowchart of FIG. 15.

Figure 15:
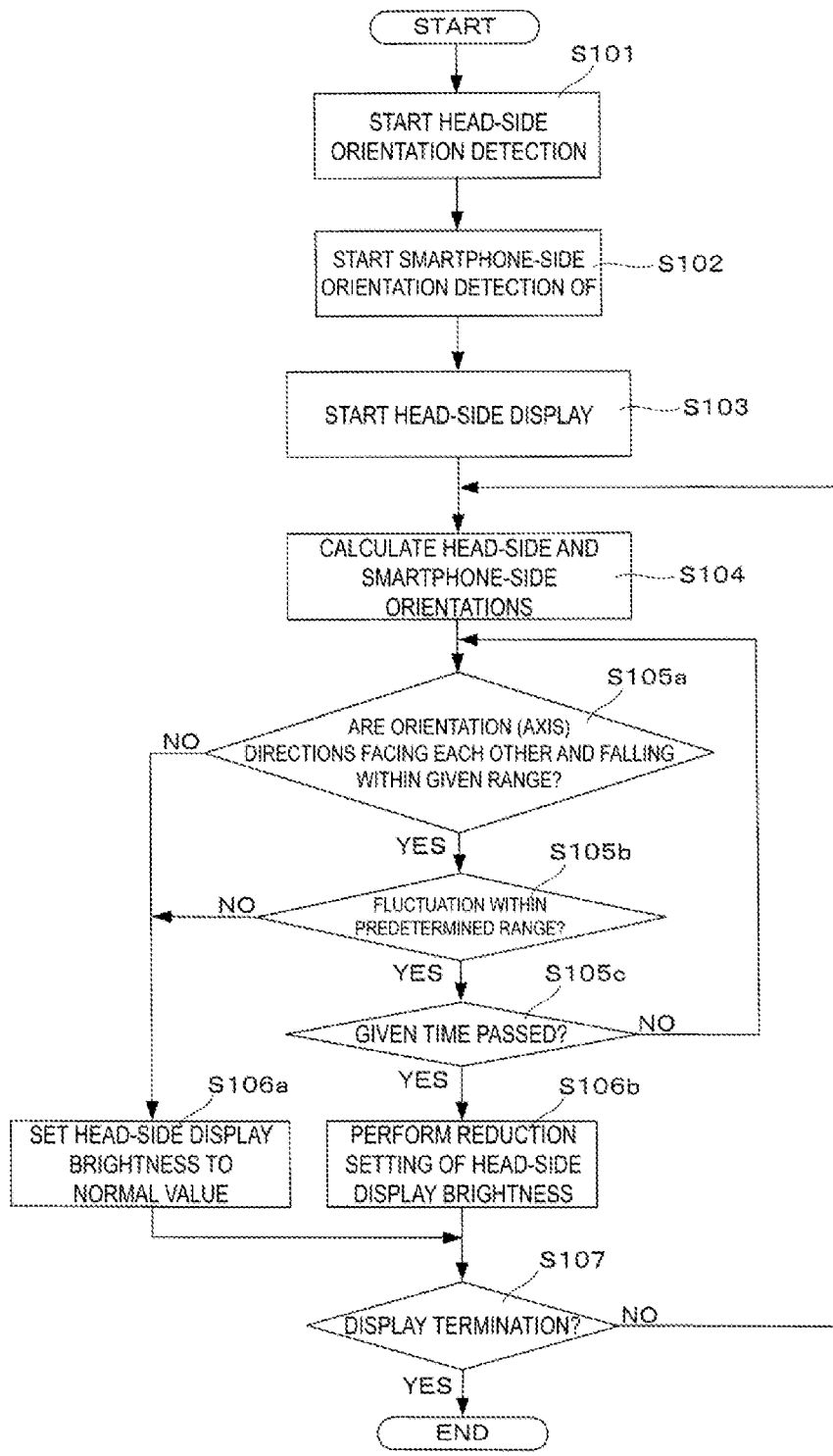
FIG. 15 is a flowchart for describing an example of an operation of the display system.

In an example illustrated in FIG. 15, steps S105a to S105c are provided instead of step S105 of FIG. 10, and the condition as to whether to perform the brightness adjustment in the wearable display device 100 is changed. Specifically, when determining whether to change the display mode of the wearable display device 100 on the basis of the computation result (calculation result) at step S104, first, whether the directions of the orientations (axes) of the normal vector DD1 of the wearable display device 100 and the normal vector DD2 of the information processing device 200 are facing each other and falling within a given range is determined at step S105a.

When it is determined at step S105a that they are facing each other and are within a given range (step S105a: YES), the display control part 150 further confirms whether the above-described directions of the orientations (axes) have a fluctuation within a given range (step S105b). Specifically, the display control part 150 determines whether the angle θ between the normal vector DD1 and the normal vector DD2 has a fluctuation within a predetermined angle range.

When it is determined at step S105b that there is a fluctuation (step S105b: YES), the display control part 150 further confirms whether the state described at step S105a and step S105b is continued for a given time or longer (step S105c). When it is determined that the state is continued for the given time or longer (step S105c: YES), the brightness of the display image of the wearable display device 100 is adjusted (step S106b).

On the other hand, when it is determined at step S105a that they do not face each other or that they are not within the given range (within the angular range) (step S105a: NO), and/or when it is determined at step S105b that the fluctuation does not meet a predetermined condition (step S105b: NO), the display control part 150 performs a setting such that the display brightness of the wearable display device 100 is maintained at a normal value (step S106a).

As described above, in this example, the display control part 150 changes the display mode of the wearable display device 100 when the angle θ between the normal vector DD1 and the normal vector DD2 has a fluctuation within a predetermined angular range, and this state falling within the predetermined angle range is maintained for a predetermined time or longer.

Among the above conditions, for example, the detection of the fluctuation falling within a given range is on the assumption of a variation (fluctuation) that naturally (i.e. inevitably) occurs when the object is held by hand by the user US, i.e., a person, and/or a variation (fluctuation) at the head. Conceivably, such movements of a person cause fluctuations in the information processing device 200 held by a person's hand and the wearable display device 100 mounted on a person's head, and therefore, by taking such fluctuations into account, it is possible to detect that the user US himself or herself maintains the wearable display device 100 and information processing device 200 in a positional relationship that satisfies a predetermined condition.

In addition, among the above-described conditions, the detection as to whether the facing state with a fluctuation has been continued for a given time or longer is intended to reduce a situation where the condition is accidentally satisfied with no intention by the user US. In other words, when the state continues for a given time or longer, it can be determined that the user US is intentionally holding it in a state where the display mode of the wearable display device 100 is desired to be changed.

Note that the above configuration can be implemented by incorporating a program corresponding to step S105a to step S105c as the change requirement determination program CJ, storing a threshold value related to the fluctuation and the given time in the threshold data storage part THd, and appropriately reading various threshold values in accordance with the change requirement determination program CJ, for example.

An example of a mode selection related to the above-described posture detection in the display system 500 is described below with reference to the flowchart of FIG. 16 and the like.

It is possible to adopt a configuration in which the user US can select whether to use the above-described mode for adjusting the brightness of the display image of the wearable display device 100 in accordance with the relative positional relationship between the wearable display device 100 and the information processing device 200, or in other words, the mode (hereinafter referred to as a detection mode) of changing the display mode in the wearable display device 100 that uses the posture detection of the first sensor SE1 and the second sensor SE2. In other words, it is possible to adopt a configuration in which the detection selection part is provided such that one of the above-described detection mode and a mode (hereinafter referred to as a non-detection mode) that does not use the posture detection of the first sensor SE1 and the second sensor SE2 for changing the display mode of the wearable display device 100, can be selected. Specifically, it can be implemented by providing the detection selection program DE described with reference to FIG. 3 in the storing part 120, and providing the detection selection key (detection selection part) 131 described with reference to FIG. 2 in the touch panel 130. To be more specific, when the user US taps a detection selection key 131, the display control part 150 reads the detection selection program DE, and which of the detection mode or the non-detection mode is employed is determined.

Figure 16:
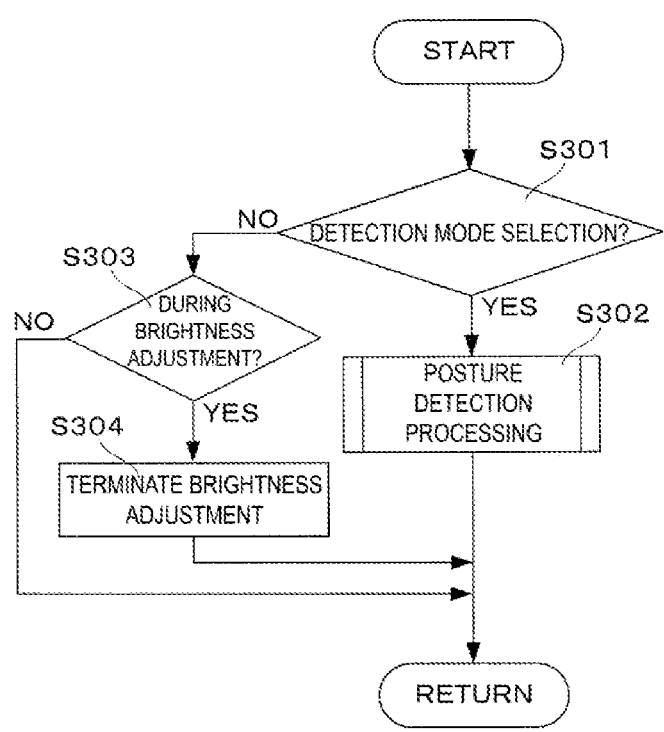
FIG. 16 is a flowchart for describing an example of selection of a detection mode in the display system.

More specifically, in the flowchart of FIG. 16, first, when display system 500 is activated, display control part 150 confirms whether the detection mode has been selected (step S301). At step S301, when it is confirmed that the detection mode has been selected (step S301: YES), the display control part 150 performs a series of processes related to the posture detection (step S302). In other words, a series of processes including the processing operation exemplified and described with reference to FIGS. 10 and 15, and further the processing operation of the calibration exemplified and described with reference to FIG. 11 as the preceding operation thereof is performed, and again the operations from step S301 are repeated until the display operation of the wearable display device 100 stops.

On the other hand, when it is confirmed at step S301 that the detection mode has not been selected, i.e., that the non-detection mode has been selected (step S301: NO), the display control part 150 confirms whether the brightness adjustment in the wearable display device 100 has been performed (step S303). In other words, the display control part 150 confirms whether the brightness adjustment is performed to change the display mode of the wearable display device 100 as a result of the series of processes at step S302 that has been previously performed. When it is determined at step S303 that the brightness adjustment has not been performed (step S303: NO), the display control part 150 again repeats the operations from step S301 until the display operation of the wearable display device 100 stops, without performing any special processing.

When it is determined at step S303 that the brightness adjustment has been performed (step S303: YES), the brightness adjustment is terminated and the brightness display is reset at the normal value, and then, the operations from the step S301 are again repeated until the display operation of the wearable display device 100 stops.

Second Embodiment

Next, a display device according to a second embodiment is described with reference to FIG. 17 and the like. Note that a display system 600 according to this embodiment is a modified example of the display system 500 according to the first embodiment, and differs from the first embodiment in that a camera is further provided as a sensor for posture detection and is used in an auxiliary manner. However, the points other than the above-described point are the same as those of the first embodiment, and therefore detailed description of the components other than the above-described component is omitted.

Figure 17:
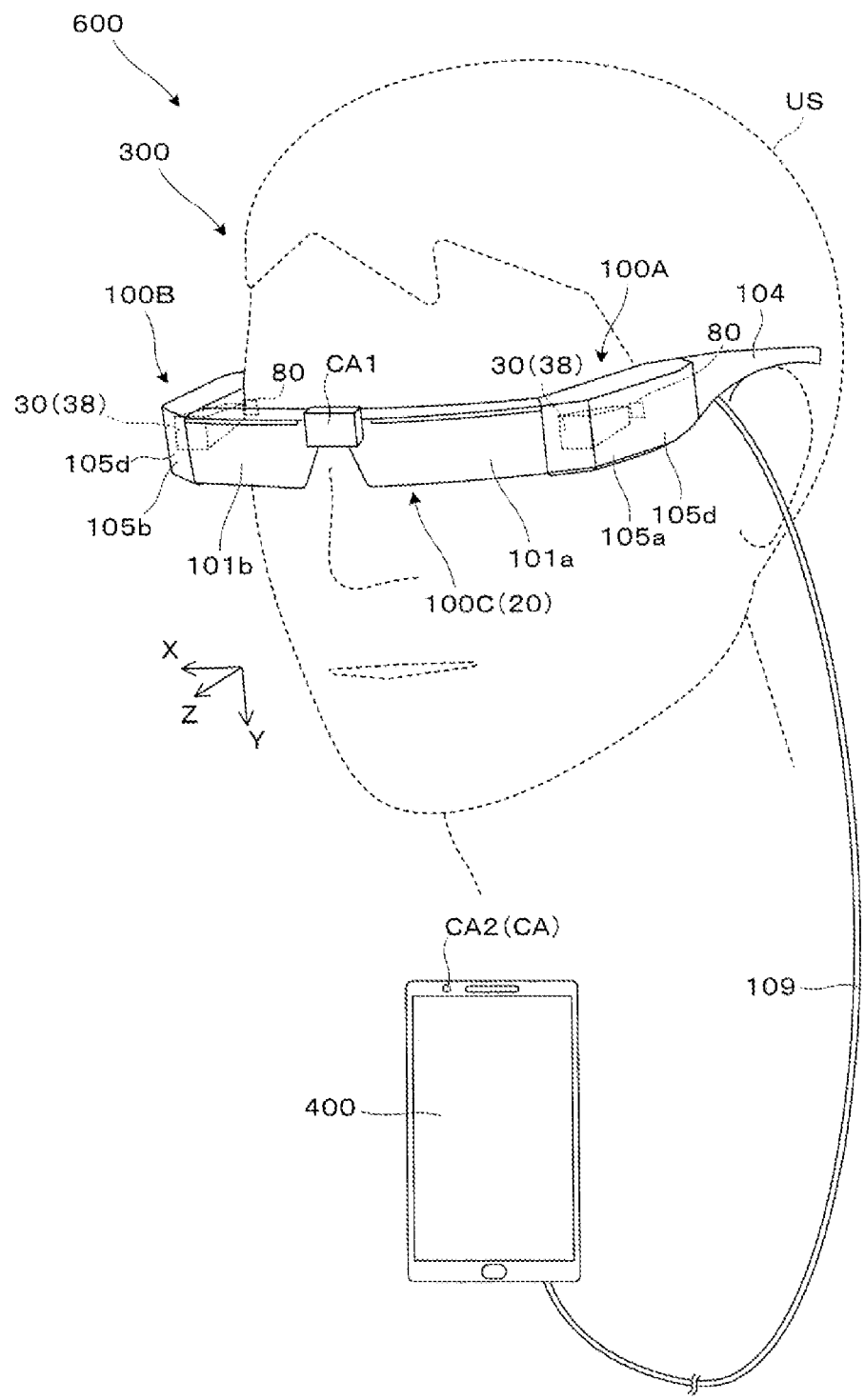
FIG. 17 is a perspective view for describing a use state of a display system according to a second embodiment.
Figure 18:
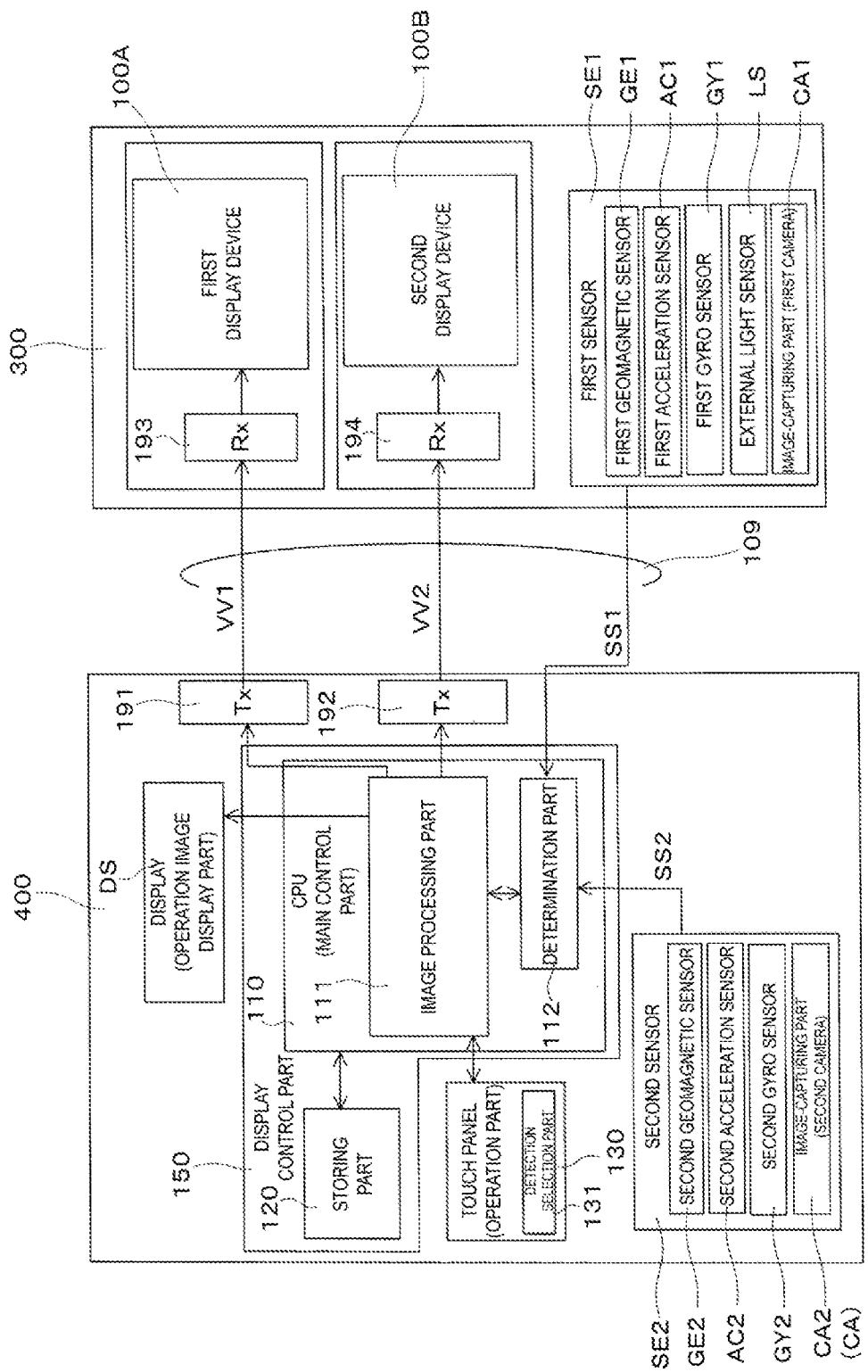
FIG. 18 is a block diagram for describing a configuration example of the display system.

FIG. 17 is a conceptual side cross-sectional view illustrating an appearance of the display system 600 according to this embodiment, and is a diagram corresponding to FIG. 1. In addition, FIG. 18 is a block diagram for describing a configuration example of the display system 600, and is a diagram corresponding to FIG. 2.

As illustrated in FIG. 17, the display system 600 includes a wearable display 300 and an information processing device 400 connected through the cable 109.

First, the wearable display device 300 of the display system 600 differs from the wearable display device 100 illustrated in FIG. 1 in that a first camera CA1 is disposed at a center portion, i.e., at a portion between the first display device 100A and the second display device 100B. For example, the first camera CA1 can be utilized for an AR (augmented reality) function, and is disposed at the center, and thus, a highly accurate position detection of the real space is achieved. That is, a configuration that suppresses the occurrence of deviation between the visual recognition direction of the user US and the camera image is provided. In this embodiment, the first camera CA1 captures an image of the surroundings of the wearable display device 300 as a part of the first sensor SE1 to perform auxiliary information acquisition related to the posture detection of the wearable display device 100. In particular, in this embodiment, the image data acquired by capturing the information processing device 400 by the first camera CA1 is employed as the information SS1. Note that also in this information acquisition, accurate image acquisition in accordance with the visual recognition direction of the user US is achieved.

On the other hand, the information processing device 400 of the display system 600 differs from the information processing device 200 illustrated in FIG. 1 in that the image-capturing part (camera) CA as the second sensor SE2 is provided as a second camera CA2. More specifically, the second camera CA2 captures an image of the surroundings of the information processing device 400 as a part of the second sensor SE2 to perform auxiliary information acquisition related to the posture detection of the information processing device 400. In particular, in this embodiment, image data acquired by capturing the wearable display device 300 by the second camera CA2 is employed as the information SS2. Note that, as described above in the first embodiment and as illustrated in FIG. 17, by employing an in-camera of the camera originally built in a smartphone as the second camera CA2 (image-capturing part CA), the image-capturing direction of the second camera CA2 can be aligned with the display direction of the display DS in image-capturing of the surroundings of the information processing device 400, and, by capturing the surroundings of the information processing device 400, the wearable display device 300 facing thereto can be captured when the wearable display device 300 and the information processing device 400 face each other and the second camera CA2 has an angle of view that is greater than or equal to the angle of view of a typical image-capturing camera. Note that the first camera CA1 is also aligned with the visual recognition direction, and therefore, by capturing the surroundings of the wearable display device 100, the information processing device 400 facing thereto can be captured when the first camera CA1 has an angle of view that is greater than or equal to the angle of view of a typical image-capturing camera.

A state of image-capturing using the first and second cameras CA1 and CA2 and its application are described with reference to an image diagram conceptually illustrating an example in FIG. 19.

First, also in this embodiment as in the first embodiment, it is important to reliably determine whether the wearable display device 300 and the information processing device 400 are facing each other. For this reason, in this embodiment, when it is determined that the wearable display device 300 and the information processing device 400 are facing each other on the basis of the posture detection at motion sensors such as the first and second geomagnetic sensors GE1 and GE2 constituting the first and second sensors SE1 and SE2, for example, image-capturing is additionally performed by the first and second cameras CA1 and CA2, and the positional relationship between the wearable display device 300 and the information processing device 400 is determined from the acquired image data.

Figure 19:
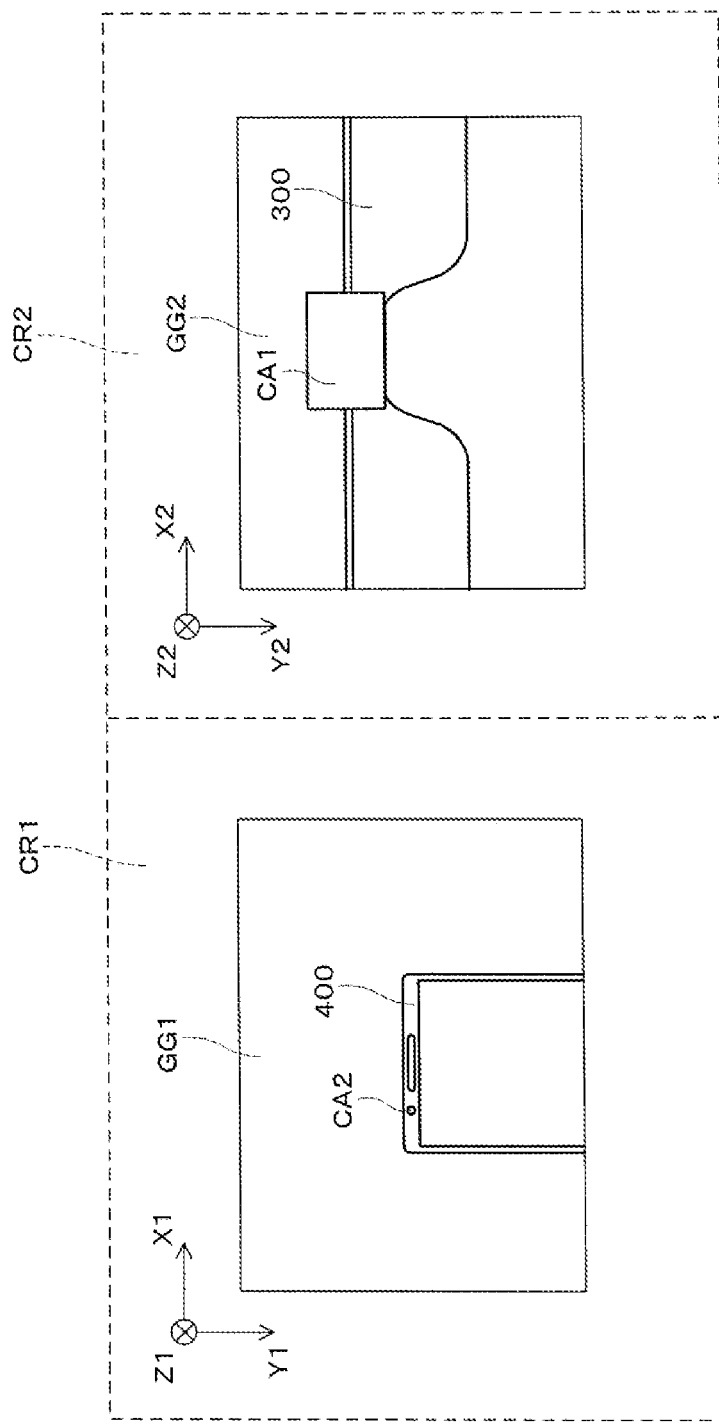
FIG. 19 is an image diagram conceptually illustrating an example of a state of image-capturing by a camera.

When the wearable display device 300 and the information processing device 400 are facing each other, the information processing device 400 is taken in image data GG1 captured by the first camera CA1 provided in the wearable display device 300, as illustrated in a first region CR1 in FIG. 19. Likewise, the wearable display device 300 is taken in image data GG2 captured by the second camera CA2 provided in the information processing device 400 as illustrated in a second region CR2 of FIG. 19.

In this case, for example, by storing in advance information related to the shape and the like of the wearable display device 300, and information related to the shape and the like of the information processing device 400 (i.e., itself) as image data in the storing part 120 of the information processing device 400, and analyzing the captured image data GG1 and GG2 by the display control part 150 on the basis of that image data, whether the wearable display device 300 and the information processing device 400 are projected can be confirmed, and it is thus possible to determine whether the wearable display device 300 and the information processing device 400 are facing each other. In addition, in this case, it is possible to more reliably detect the facing state from the size, position, and the like of the projected devices.

As described above, also in this embodiment, the relative positional relationship between the wearable display device 300 and the information processing device 400 can be determined by using the detection of the wearable display device 300 and the information processing device 400 at the first and second sensors SE1 and SE2. Further, in this embodiment, the first sensor SE1 includes the first camera CA1 that captures an image of the surroundings of the wearable display device 300, and the second sensor SE2 includes the second camera CA2 that captures the surroundings of the information processing device 400. Further, the display control part 150 is configured to change the display mode of the wearable display device 300 on the basis of the image data GG2 of the wearable display device 300 captured by the second camera CA2 and the image data GG1 of the information processing device 400 captured by the first camera CA1. Thus, the determination based on the image-capturing by the first and second cameras CA1 and CA2 is achieved.

Figure 20:
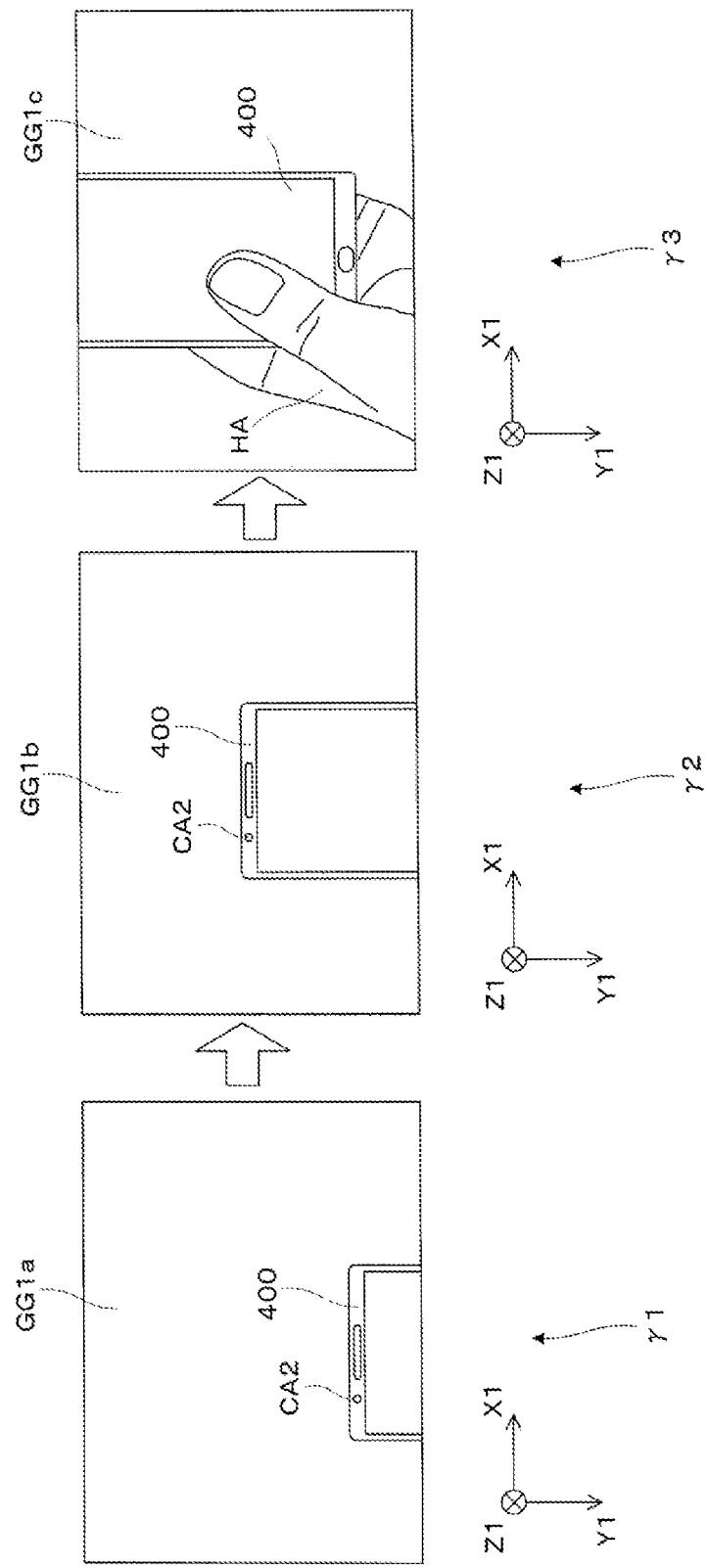
FIG. 20 is an image diagram conceptually illustrating another example of the state of image-capturing by the camera.

An example of a determination method using the first camera CA1 is described below with reference to FIG. 20. Note that FIG. 20 is an image diagram conceptually illustrating another example of a state where an image is captured by the first camera CA1.

The example illustrated in the drawing illustrates an example of a case where continuous image-capturing is performed by the first camera CA1. Here, as illustrated in states γ1 to γ3, a case is illustrated in which a portion of the information processing device 400 or a hand HA of the user US is detected on the lower side (+Y1 side) in the image captured by the first camera CA1. Specifically, a portion of the information processing device 400 is projected on the lower side (+Y1 side) in image data GG1a illustrated in the initial state γ1. The information processing device 400 gradually moves toward the upper side (−Y1 side) with time as in image data GG1b illustrated in the state γ2, and finally the hand HA of the user US and the information processing device 400 are projected as in image data GG1c illustrated in the state γ3. It is possible to determine whether the wearable display device 300 and the information processing device 400 are in a specific relative positional relationship by detecting at the display control part 150 that a portion of the information processing device 400 and/or the hand HA of the user US are projected from the lower side (+Y1 side) in the image in the above-described manner. In other words, the display control part 150 may start to determine whether to change the display mode of the wearable display 300 when a portion of the information processing device 400 and/or the hand HA of the user US is detected on the lower side in the image captured by the first camera CA1.

Modifications and Other Matters

The above-described structures are examples, and various modifications may be made to the extent that similar functions can be achieved.

As the mode of changing the display mode of the wearable display device 100, an example is described in the above description in which an image is lightly displayed in the wearable display device 100 in order to increase the transparency by gradually reducing the display brightness of the wearable display device 100, i.e., by weakening the image light in the see-through. However, regarding the change of the display mode, it suffices that blocking of the line of sight of the user US by the image of the display part can be prevented when the display part of the wearable display device 100 and the information processing device 200 composed of a smartphone or the like face each other, and various aspects may be conceivable other than the above-described configurations. For example, in a manner that the image of the wearable display device 100 is diverted from the line of sight of the user US, the image in the direction of the line of sight of the user US may be moved and displayed in a smaller size at a corner so as to provide a space at the center of the line of sight.

In addition to the above, the distance between the wearable display device 100 and the information processing device 200 may be detected by detecting the positions of the wearable display device 100 and the information processing device 200, for example. Specifically, a determination may be made as to whether the distance is within a reasonable range when the information processing device 200 is held by a hand in a state where a person is wearing the wearable display device 100. It is also possible to confirm the occurrence of misalignment between them.

In addition, while, in the above configuration, when determining whether there is a predetermined positional relationship for changing the display mode, i.e., whether the wearable display device 100 and the information processing device 200 are facing each other, an angle θ between the normal vector DD1 and the normal vector DD2 is set to a range of $160° \leq \theta \leq 180°$ (when it is defined by the supplementary angle of the angle θ, the supplementary angle of 20 degrees or less), various aspects of the criteria of the determination may also be conceivable. For example, the above-described distance between the wearable display device 100 and the information processing device 200 may be further taken into account. When the user US wants to see the image of the information processing device 200, i.e., the smartphone, rather than the picture of the wearable display device 100, the information processing device 200 would be brought closer to a location within a certain range. Specifically, whether to change the display mode may be determined based on whether the angle θ between the normal vector DD1 and the normal vector DD2 satisfies a predetermined range when determining whether the distance with the information processing device 200 held by hand is within a reasonable range.

In addition, while the information acquisition by the camera is an auxiliary information acquisition in the above-described second embodiment, it is also conceivable to use the information acquisition by the camera as a main information acquisition while using the motion sensor in an auxiliary manner. In addition, while a case where both the first camera CA1 and the second camera CA2 are used as the camera is described above, only one of the cameras may be used. Further, an aspect is also conceivable in which the image-capturing part CA of the first embodiment is used as the second camera CA2 described in the second embodiment.

In addition, while the normal vectors for determining the facing state are determined in a three-dimensional space in the above description, it is also conceivable to make the determination based on a two-dimensional normal vector acquired through detection with respect to two-dimensional directions of east, west, south, and north.

In addition, various aspects may be conceivable also for the calibration. For example, a configuration is conceivable in which after the initial setting has been performed, the postures of the wearable display device 100 and the information processing device 200 can be detected by following their movement using the gyro sensors (angular velocity sensors) GY1 and GY2.

In addition, while the display control part 150 is provided in the information processing devices 200 and 400 in the above description, it is also possible to provide a display control part that corresponds to the display control part 150 and performs various processes for changing the display mode, in a part other than the information processing devices 200 and 400. For example, a display control part composed of a CPU or the like may be provided between the wearable display device 100 and the information processing device 200, and a display control part may be provided on the wearable display device 100 side. In addition, it is also conceivable to adopt a display control part isolated from the wearable display device 100 and the information processing device 200, and configured to communicate with the wearable display device 100 and the information processing device 200 through wireless communication.

In addition, while the information processing device 200 constituting the display control part 150 is composed of a smartphone or the like in the above description, it is not limited to a smartphone, and it is also possible to adopt a configuration in which a device that corresponds to the display control part 150 and performs various processes is included in the body side of the HMD as the wearable display device 100, and the user holds only a controller part by hand.

In addition, various aspects may be conceivable also for the configuration of the display system 500, and the disclosure of the present application can be applied also to an aspect in which the part corresponding to the body of the HMD, i.e., the part of the wearable display device 100 is used as a display part of a personal computer or various devices, and an aspect in which the HMD is configured as a standalone wearable computer in which a CPU and a battery is mounted. In addition, in such cases, an aspect is conceivable in which an input device (including a geomagnetic sensor) of a clock type including a display surface is used as the information processing device 200, for example.

While a so-called optical see-through is exemplified in the above description, it is also possible to apply the present disclosure to a video see-through. In the case of a video see-through, it is conceivable to change the display mode of the wearable display device 100 to switch the image such that the external environment is projected as it is.

While various geomagnetic sensors GE1 and GE2 are applicable in the above description, it is conceivable to employ, for example, a Hall sensor, a magneto resistance (MR) sensor, a magneto impedance (MI) sensor or the like.

To perform the azimuthal calculation with high accuracy, it is desirable to calibrate the geomagnetic sensor during the calibration, and for example, the geomagnetic sensor may be spatially rotated once in the geomagnetic field during the calibration such that the midpoint is determined from the output peak. In addition, an operation corresponding to this may be performed by automatic calibration. In addition, it is also conceivable to measure the relative relationship between the geomagnetic sensor GE1 and the geomagnetic sensor GE2 such that the relative relationship between the geomagnetic sensor GE1 and the geomagnetic sensor GE2 can be accurately measured even in a location where the magnetic field is shifted.

While the display element 80 is an organic EL display panel or a panel for LCD in the above description, the display element 80 may be a self-luminous display element represented by an LED array, a laser array, a quantum dot light-emitting element, and the like. Further, the display element 80 may be a display using a laser scanner composed of a combination of a laser light source and a scanner. Note that the liquid crystal on silicon (LCOS) technique may be used instead of the LCD panel.

In addition, the main circuit board MD, the left-eye circuit board DL, the right-eye circuit board DR, and the camera circuit board that controls the operation of the first camera CA1 are composed of semiconductor elements such as computation elements and conversion elements. Specifically, for example, the main circuit board MD may include at least one of circuits such as a digital signal processor (DSP), an application specific integrated circuit (ASIC), a programmable logic device (PLD), a field programmable gate array (FPGA), a graphics processing unit (GPU), and a central processing unit (CPU).

As described above, the display system according to a specific aspect includes a display device configured to display an image to be visually recognized by a user, an information processing device configured to connect to the display device, a first sensor provided at the display device and including a first geomagnetic sensor, the first sensor being configured to detect a posture of the display device, a second sensor provided at the information processing device and including a second geomagnetic sensor, the second sensor being configured to detect a posture of the information processing device, and a display control part configured to change a display mode of the display device in accordance with a relative positional relationship between the display device and the information processing device, the relative positional relationship being computed based on a detection result obtained by the first geomagnetic sensor and a detection result obtained by the second geomagnetic sensor.

In the above-described display system, by using the detection of the display device by the first geomagnetic sensor of the first sensor and the detection of the information processing device by the second geomagnetic sensor of the second sensor, the relative positional relationship between the display device and the information processing device can be determined without providing a light receiving part, a light emitting part, and the like in the display device and the information processing device, and the display control part can change the display mode of the display device on the basis of the relative positional relationship. In this case, for example, it is possible to determine that the user of the display system is about to operate the control part on the basis of the relative positional relationship between the display device and the information processing device, and it is thus possible to achieve a configuration in which in accordance with that determination, the visibility of the information processing device is increased by changing and reducing the brightness as a display mode of the display device. Note that, for example, a body portion including an optical system that performs the formation of an image to be visually recognized in the HMD can be used as the display device, and an existing product such as a smartphone can be used as the information processing device. In such a case, by using a geomagnetic sensor originally provided in the HMD or the smartphone, the above-described configuration can be achieved without additionally providing another component.

In a specific aspect, the display control part includes a determination part configured to determine whether the relative positional relationship is a predetermined positional relationship for changing the display mode of the display device. In this case, it is possible to determine whether there is a situation where the user operates the information processing device in accordance with whether there is the predetermined positional relationship.

In another aspect, the display control part reduces a display brightness of the display device when the determination part determines that the display device and the information processing device have the predetermined positional relationship. In this case, the visibility of the information processing device can be increased by reducing the display brightness.

In another aspect, the information processing device includes an operation screen display part configured to display an operation image, and the display control part changes the display mode of the display device when an angle between a normal vector of a first image surface and a normal vector of a second image surface is within a predetermined angle range, the first image surface being an image surface of an image to be visually recognized by the display device, the second image surface being an image surface to be visually recognized by the operation screen display part of the information processing device. In this case, it is possible to determine whether the display mode of the display device should be changed by determining whether the display device and the information processing device are facing each other on the basis of the calculation result of the angle.

In another aspect, the display control part changes the display mode of the display device when a state where the angle is within the predetermined angle range is maintained for a predetermined time or longer. In this case, the occurrence of the positional relationship that accidentally satisfies the condition with no intention by the user can be excluded from the object of the detection.

In another aspect, the display control part changes the display mode of the display device when an angle between a normal direction of the first image surface and a normal direction of the second image surface has a fluctuation within a predetermined range. In this case, by taking the fluctuation into account, it is possible to detect that the user intentionally maintains the display device and the information processing device in a positional relationship that satisfies a predetermined condition.

In another aspect, the display control part changes the display mode of the display device when the first image surface and the second image surface overlap when seen from the user. In this case, even when the first image surface and the second image surface overlap each other, the visibility of the information processing device can be increased.

In another aspect, the display system has an initial setting mode for performing, through a calibration, an initial setting for the relative positional relationship for determining whether to change the display mode of the display device. In this case, the user can set posture for operating the information processing device by himself or herself.

In another aspect, the first sensor includes a first camera configured to capture an image of surroundings of the display device, the second sensor includes a second camera configured to capture an image of surroundings of the information processing device, and the display control part changes the display mode of the display device on a basis of image data of the display device captured by the second camera and image data of the information processing device captured by the first camera. In this case, determination based on the image-capturing by the first and second cameras is achieved.

In another aspect, the display control part starts a determination as to whether to change the display mode of the display device when a portion of the information processing device or a hand of the user is detected on a lower side in an image captured by the first camera. A state for operating the information processing device can be detected from the content in the image.

In another aspect, a detection selection part is further provided, and the detection selection part is configured to enable selection of one of a detection mode and a non-detection mode, the detection mode being a mode for changing the display mode of the display device by using posture detection of the first sensor and the second sensor, the non-detection mode being a mode in which the posture detection of the first sensor and the second sensor is not used for changing the display mode of the display device. In this case, the user can select whether to use the detection mode.

In another aspect, the first sensor and the second sensor include an acceleration sensor and a gyro sensor. In this case, more reliable and accurate detection of the posture can be achieved.

In another aspect, the display control part performs fade-out of a display as the change of the display mode of the display device. In this case, with the gradual change, it is possible to make the user aware that the display mode of the display device is changing.

As described above, the display method according to a specific aspect is a method for a display system including a display device configured to display an image to be visually recognized by a user, and an information processing device configured to connect to the display device, the method including detecting a posture of the display device by a first sensor including a first geomagnetic sensor, detecting a posture of the information processing device by a second sensor including a second geomagnetic sensor, computing a relative positional relationship between the display device and the information processing device on a basis of a detection result obtained by the first geomagnetic sensor and a detection result obtained by the second geomagnetic sensor, and changing a display mode of the display device in accordance with the computed relative positional relationship.

In the above-described display method, by using the detection of the display device by the first geomagnetic sensor of the first sensor and the detection of the information processing device by the second geomagnetic sensor of the second sensor, the relative positional relationship between the display device and the information processing device can be determined without providing a light receiving part, a light emitting part, and the like in the display device and the information processing device, and the display mode of the display device can be changed based on the relative positional relationship. In this case, for example, it is possible to determine that the user of the display system is about to operate the control part on the basis of the relative positional relationship between the display device and the information processing device, and it is thus possible to achieve a configuration in which in accordance with that determination, the visibility of the information processing device is increased by changing and reducing the brightness as a display mode of the display device. Note that, for example, a body portion including an optical system that performs the formation of an image to be visually recognized in the HMD can be used as the display device, and an existing product such as a smartphone can be used as the information processing device. In such a case, by using a geomagnetic sensor originally provided in the HMD or the smartphone, the above-described configuration can be achieved without additionally providing another component.

As described above the display program according to a specific aspect is a display program for a display system including a display device configured to display an image to be visually recognized by a user, and an information processing device configured to connect to the display device, the method including detecting a posture of the display device by a first sensor including a first geomagnetic sensor, detecting a posture of the information processing device by a second sensor including a second geomagnetic sensor, computing a relative positional relationship between the display device and the information processing device on a basis of a detection result obtained by the first geomagnetic sensor and a detection result obtained by the second geomagnetic sensor, and changing a display mode of the display device in accordance with the computed relative positional relationship.

In the above-described display program, by using the detection of the display device by the first geomagnetic sensor of the first sensor and the detection of the information processing device by the second geomagnetic sensor of the second sensor, the relative positional relationship between the display device and the information processing device can be determined without providing a light receiving part, a light emitting part, and the like in the display device and the information processing device, and the display mode of the display device can be changed based on the relative positional relationship. In this case, for example, it is possible to determine that the user of the display system is about to operate the control part on the basis of the relative positional relationship between the display device and the information processing device, and it is thus possible to achieve a configuration in which in accordance with that determination, the visibility of the information processing device is increased by changing and reducing the brightness as a display mode of the display device. Note that, for example, a body portion including an optical system that performs the formation of an image to be visually recognized in the HMD can be used as the display device, and an existing product such as a smartphone can be used as the information processing device. In such a case, by using a geomagnetic sensor originally provided in the HMD or the smartphone, the above-described configuration can be achieved without additionally providing another component.

What is claimed is:

1. A display system comprising:
    a display device that displays an image to be visually recognized by a user and that includes a first geomagnetic sensor detecting a posture of the display device; and
    an information processing device that connects to the display device, and that includes:
        an operation screen display part displaying an operation image;
        a second geomagnetic sensor detecting a posture of the information processing device; and
        a display control part (i)storing a predetermined position between the display device and the information processing device that is set by the user, (ii)obtaining a relative position between the display device and the information processing device based on the posture of the display device and the posture of the information processing device, (iii)determining whether the relative position between the display device and the information processing device is the predetermined position that is set by the user, and (iv) changing a display mode of the display device in which a brightness of the image displayed on the display device is darker than a brightness of the operation image displayed on the operation screen display part of the information processing device when the relative position between the display device and the information processing device is the predetermined position that is set by the user.

2. The display system according to claim 1, wherein the display control part changes the display mode of the display device when an angle between a normal vector of a first surface of the display device and a normal vector of a second surface of the operation screen display part of the information processing device is within a predetermined angle range, the first surface of the display device being an image surface to display the image, the second surface of the operation screen display part of the information processing device being an image surface to display the operation image.

3. The display system according to claim 2, wherein the display control part changes the display mode of the display device when a state where the angle is within the predetermined angle range is maintained for a predetermined time or longer.

4. The display system according to claim 2, wherein the display control part changes the display mode of the display device when an angle between a normal direction of the first surface of the display device and a normal direction of the second surface of the operation screen display part of the information processing device has a fluctuation within a predetermined range.

5. The display system according to claim 1, wherein
    the display device includes a first camera configured to capture a capturing image around the display device;
    the information processing device includes a second camera configured to capture a capturing image around the information processing device; and
    the display control part changes the display mode of the display device on a basis of image data of the display device captured by the second camera and image data of the information processing device captured by the first camera.

6. The display system according to claim 5, wherein the display control part starts a determination as to whether to change the display mode of the display device when a portion of the information processing device or a hand of the user is detected on a lower side in an image captured by the first camera.

7. The display system according to claim 1, further comprising:
a detection selection part configured to enable selection of one of a detection mode and a non-detection mode, the detection mode being a mode for changing the display mode of the display device by using posture detection of the first geomagnetic sensor and the second geomagnetic sensor, the non-detection mode being a mode in which the posture detection of the first geomagnetic sensor and the second geomagnetic sensor is not used for changing the display mode of the display device.

8. The display system according to claim 1, wherein
the display device includes a first acceleration sensor and a first gyro sensor, and
the information processing device includes a second acceleration sensor and a second gyro sensor.

9. The display system according to claim 1, wherein the display control part performs fade-out of a display as the change of the display mode of the display device.

10. A display method for a display system including a display device that displays an image to be visually recognized by a user, and an information processing device that connects to the display device and that includes an operation screen display part displaying an operation image, the method comprising:
storing a predetermined position between the display device and the information processing device that is set by the user,
detecting a posture of the display device by a first geomagnetic sensor provided on the display device;
detecting a posture of the information processing device by a second geomagnetic sensor provided on the information processing device;
obtaining a relative position between the display device and the information processing device based on the posture of the display device and the posture of the information processing device;
determining whether the relative position between the display device and the information processing device is the predetermined position that is set by the user, and
changing a display mode of the display device in which a brightness of the image displayed on the display device is darker than a brightness of the operation image displayed on the operation screen display part of the information processing device when the relative position between the display device and the information processing device is the predetermined position that is set by the user.

11. A non-transitory computer-readable storage medium storing a display program for a display system including a display device that displays an image to be visually recognized by a user, and an information processing device that connects to the display device and that includes an operation screen display part displaying an operation image, the method comprising:
storing a predetermined position between the display device and the information processing device that is set by the user,
detecting a posture of the display device by a first geomagnetic sensor provided on the display device;
detecting a posture of the information processing device by a second geomagnetic sensor provided on the information processing device;
obtaining a relative position between the display device and the information processing device based on the posture of the display device and the posture of the information processing device;
determining whether the relative position between the display device and the information processing device is the predetermined position that is set by the user, and
changing a display mode of the display device in which a brightness of the image displayed on the display device is darker than a brightness of the operation image displayed on the operation screen display part of the information processing device when the relative position between the display device and the information processing device is the predetermined position that is set by the user.

\* \* \* \* \*